(12) United States Patent
Braddock

(10) Patent No.: US 11,668,552 B1
(45) Date of Patent: Jun. 6, 2023

(54) MULTI-FUNCTION SQUARE GAUGES AND METHODS OF USE

(71) Applicant: Lawrence David Braddock, Los Angeles, CA (US)

(72) Inventor: Lawrence David Braddock, Los Angeles, CA (US)

(*) Notice: Subject to any disclaimer, the term of this patent is extended or adjusted under 35 U.S.C. 154(b) by 309 days.

(21) Appl. No.: 17/074,248

(22) Filed: Oct. 19, 2020

Related U.S. Application Data

(63) Continuation-in-part of application No. 16/350,477, filed on Nov. 20, 2018, now abandoned.

(51) Int. Cl.
| | |
|---|---|
| *G01B 3/56* | (2006.01) |
| *E04F 21/26* | (2006.01) |
| *E04G 21/18* | (2006.01) |
| *B43L 7/027* | (2006.01) |
| *B25H 7/04* | (2006.01) |

(52) U.S. Cl.
CPC .............. *G01B 3/566* (2013.01); *B25H 7/04* (2013.01); *B43L 7/027* (2013.01); *E04F 21/26* (2013.01); *E04G 21/1891* (2013.01)

(58) Field of Classification Search
CPC ..... G01B 3/566; E04F 21/26; E04G 21/1891; B43L 7/027; B25H 7/00; B25H 7/04
USPC .............. 33/29, 42, 323, 429, 474, 475, 484
See application file for complete search history.

(56) References Cited

U.S. PATENT DOCUMENTS

| | | | | |
|---|---|---|---|---|
| 124,887 | A * | 3/1872 | Dalgliesh | G01B 5/043 33/747 |
| 2,474,577 | A * | 6/1949 | Gancer | G01B 3/566 33/475 |
| 3,623,232 | A * | 11/1971 | Mahlstadt | E04G 21/1891 33/423 |
| 2009/0039214 | A1* | 2/2009 | Cullen | B25B 5/163 248/176.1 |

FOREIGN PATENT DOCUMENTS

GB           885668           12/1961

OTHER PUBLICATIONS

Omni Stair Gauges, Rafter Gauges for Framing, Rafter Square; youtube.com video; https://www.youtube.com/watch?v=AHwYSjNdu9k; OmniToolWorks; accessed Nov. 7, 2022, published Nov. 29, 2017. (Year: 2017).*

(Continued)

*Primary Examiner* — Daniel J Colilla
(74) *Attorney, Agent, or Firm* — Master Key IP, LLP; Jeromye V. Sartain

(57) ABSTRACT

A square gauge apparatus configured for being selectively and removably mounted on a leg of a carpenter's square has a ledge having a ledge first surface and an opposite ledge second surface, the ledge first and second surfaces being parallel and offset, a first abutment extending from the ledge and having a first abutment front surface that is perpendicular to the ledge first surface, a second abutment extending from the ledge opposite the first abutment and having a second abutment front surface that is perpendicular to the ledge second surface and parallel to and coplanar with the (Continued)

first abutment front surface, and a slot formed adjacent to the ledge between the first and second abutments, the slot having a slot end surface that is parallel to and coplanar with the first and second abutment front surfaces.

20 Claims, 10 Drawing Sheets

(56) References Cited

OTHER PUBLICATIONS

Amazon.com "Johnson Level & Tool 405 Stair Gauge 2-Pack" web page content obtained Sep. 7, 2020 from https://www.amazon.com/Johnson-Level-Stair-Gauge-2-Pack/dp/B00002NBKH?th=1.

Squijig.com "Squi.Jig 1¼" Tall—Framing Square Attachments (Blue)" web page content obtained Sep. 7, 2020 from https://squijig.com/products/squi-jig-framing-square-attachment-pair?variant=29461272854581&currency=USD&utm_medium=product_sync&utm_source=google&utm_content=sag_organic&utm_campaign=sag_organic.

Toolbarn.com "L.S. Starrett 111 Stair Gauge Fixture Attachments" web page content obtained Sep. 7, 2020 from https://www.toolbarn.com/starrett-111.html/?gclid=CjwKCAjw34n5BRA9EIWwA2u9k36rQohfsK4CrftYyTOiuRvExt1M5FCWDaZKhzvafudp9Nbw61E7G1xoCAF4QAvD_BwE.

Woodhaven.com "Woodhaven 8715 Deluxe Stair Gauge Kit" web page content obtained Sep. 7, 2020 from https://woodhaven..com/products/woodhaven-8715-deluxe-stair-gauge-kit?_pos=1&_sid=bd2837afa&_ss=r.

Woodhaven "8715 Deluxe Stair Gauges Owners Manual" obtained on Sep. 7, 2020 from Woodhaven.com.

* cited by examiner

MULTI-FUNCTION SQUARE GAUGES AND METHODS OF USE

RELATED APPLICATIONS

This is a continuation-in-part application and so claims the benefit pursuant to 35 U.S.C. § 120 of a prior filed and co-pending U.S. Non-Provisional patent application Ser. No. 16/350,477 filed Nov. 20, 2018, and entitled "Multi function gauges which expand the uses of carpenters steel squares," which itself claimed priority pursuant to 35 U.S.C. § 119(e) to U.S. Provisional Patent Application Ser. No. 62/708,404 filed Dec. 8, 2017, and entitled "Multi function gauges which expand the uses of carpenter steel squares," though which priority claim was not entered. The contents of the aforementioned application(s) are incorporated herein by reference.

BACKGROUND

The subject of this patent application relates generally to geometrical carpentry instruments, and more particularly to gauges configured for removably engaging a carpenter's square to selectively provide additional functionality and convenience in use.

The following description includes information that may be useful in understanding the present invention. It is not an admission that any of the information provided herein is prior art or relevant to the presently claimed invention, or that any publication specifically or implicitly referenced is prior art.

Applicant(s) hereby incorporate herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, a "carpenter's square," also referred to as a "steel square" or "framing square," is a commonly used tool in carpentry usually made of flat steel or other metal. Such a carpenter's square has a relatively longer and wider leg and a relatively shorter and narrower leg that meet at an angle of ninety degrees (90°) or at a right angle. Most typically, the larger leg is two inches (2 in.) wide and twenty-four inches (24 in.) long and is referred to as the "blade" and the smaller leg is one-and-a-half inches (1.5 in.) wide and sixteen inches (16 in.) long and is referred to as the "tongue," with both legs, or the overall square, being on the order of an eighth inch (⅛ in.) thick. Such a carpenter's square is employed in a variety of ways in carpentry, including laying out rafters and stairs and other repetitive cuts, and is often provided along both legs with a variety of scales for linear and angular measurements.

Another common carpentry and woodworking tool is typically called a "try square," which is primarily used for marking or measuring a ninety-degree or right angle, so-called because the tool is thus used to confirm or "try" the squareness of a board edge, corner, or joint. A traditional try square has a relatively thinner steel or other metal blade that is riveted within a slotted relatively thicker wooden handle or "stock," though more recently such try squares may be formed of a single material such as cast or extruded metal or molded or extruded plastic. A somewhat related carpentry tool called a "speed square" is also usually formed of metal or plastic here in a triangular configuration with the "square" or ninety-degree edges being on the outside rather than on the inside of the tool but with a perpendicular ledge extending from one or both surfaces of the square along one of its edges. With such an abutment being along or at an edge, the scale or graduations along the other perpendicular edge of the speed square are thus measured from the abutment. And again being triangular, the speed square with appropriate markings or graduations thus provides for angular measurements of basically between zero and ninety degrees (0-90°). Both try squares and speed squares are typically on the order of six to nine inches (6-9 in.) on a side or edge in terms of overall size.

The carpenter's square is the preferred or required tool for larger repetitive cuts such as in stair and rafter layouts working with nominal "two by" lumber, though such a square is also preferable when doing larger rip cuts due to the lengths of the legs as compared with the smaller try squares and speed squares. But because the carpenter's square is typically flat with no abutting edges as there are in the try squares and speed squares, use of the carpenter's square can oftentimes be inconvenient and frustrating or at least inefficient.

To improve upon the use and versatility of carpenter's squares, various gauges or accessories have been proposed over the years for attaching to one or both legs (blade and/or tongue) of the square and thereby setting a location along one leg relative to the other leg and/or gauge, again for repetitive cuts or marking the spacing of serial rafter or stud locations or rise-run or tread and riser locations along a stair stringer.

The most common of these prior square gauges are often simply called "stair gauges," which are designed as small clamp-on accessories in the nature of a miniature C-clamp or the like with a thumb screw for selectively attaching such gauges on the carpenter's square, with one such stair gauge on the blade or larger leg of the square and one on the tongue or smaller leg to mark the stair rise and run or riser and tread dimensions. The typical such stair gauges are essentially formed as a brass nut, or as having a hexagonal or six-sided body with a transverse slot machined partway through the body for receipt of a leg of a carpenter's square and having a thumb screw threadably engaged in the body so as to intersect the slot and thus selectively tighten against the inserted leg of the carpenter's square and temporarily secure the gauge thereon, such as the Model 405 Stair Gauges manufactured by Johnson Level & Tool in Mequon, Wis. A similar such hexagonal nut-type stair gauge but with a relatively longer body is manufactured by a company called Squi.Jig in Portland, Oreg. But with the body of any such square gauges being small (on the order of three quarter inch (¾ in.) across) and hexagonal and with the slot bottom not even being square with one of the six sides, such square gauges are not very helpful for marking out repetitive cuts even for stair stringers let alone other stud and rafter cuts and cross cuts primarily because there are no square edges that extend to the edge of the board let alone over the board (requiring some "eye-balling" or "guestimating" by the carpenter rather than being able to accurately or precisely mark off the corners between successive rise and run or riser and tread cuts, for example).

An alternative stair gauge product, the Model 111 Stair Gauge Fixture Attachments manufactured by L.S. Starrett Company in Athol, Mass., while having an elongate or flared body as compared with the typical Johnson gauges noted above (Starrett also making such nut-style stair gauges), still suffers many of the same shortcomings in terms of not being able to square the gauges with the actual edge of a leg of the carpenter's square, let alone having an abutting edge that is vertically aligned with such an edge of the square so as to maintain the accuracy of the graduations along the other leg of the square relative to the leg on which the gauges are installed and thus the edge of the board or other material being marked for cutting. Moreover, while the Starrett gauges have "ends [that] are machined square for true work contact and alignment with square blade graduations" so as to improve upon the Johnson-style gauges in terms of marking the corners or transitions between rise and run cuts in stair and rafter contexts, like with the Johnson gauges, there being no square edges that extend over the board, repetitive cuts are not marked as conveniently and there is no means for supporting the carpenter's square on the workpiece "hands free."

Recently, a more involved stair gauge set was introduced to the market—the Model 8715. Deluxe Stair Gauge Kit manufactured by Woodhaven, Inc. in Durant, Iowa. The Woodhaven stair gauges are specifically designed only for marking out stair stringer cuts and the like and so have each gauge specially designed for each leg of the typical carpenter's square: a relatively larger clamp-on gauge for the relatively larger two-inch-wide leg (blade) and a relatively smaller clamp-on gauge for the relatively smaller one-and-a-half-inch-wide leg (tongue), with an optional twenty-four inch (24 in.) fence for spanning between the two gauges and setting the edge of the stringer so as to span voids and damaged areas and further avoid any radiused edges of the stringer. The Woodhaven gauges not accommodating both gauges on the same leg of the square (particularly the larger leg) and not having any abutment that is square to the leg of the carpenter's square let alone vertically aligned with such edge, they again suffer some of the same shortcomings as the Johnson and Starrett gauges when it comes to stud, joist, and rafter placement layout, or other repetitive cut lines and supporting the carpenter's square on the workpiece.

What has been needed and heretofore unavailable is a more versatile and multi-function square gauge or gauge set for effectively configuring or adapting a carpenter's square as an enlarged try square or speed square of sorts for better facilitating a variety of carpentry and framing cuts. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a new and novel square gauge apparatus for selectively marking a workpiece in conjunction with a carpenter's square or the like. In at least one embodiment, the square gauge apparatus configured for being selectively and removably mounted on a leg of a carpenter's square comprises a ledge having a ledge first surface and an opposite ledge second surface, the ledge first and second surfaces being parallel and offset, a first abutment extending from the ledge and having a first abutment front surface that is perpendicular to the ledge first surface, a second abutment extending from the ledge opposite the first abutment and having a second abutment front surface that is perpendicular to the ledge second surface and parallel to and coplanar with the first abutment front surface, and a slot formed adjacent to the ledge between the first and second abutments, the slot having a slot end surface that is parallel to and coplanar with the first and second abutment front surfaces, whereby the apparatus is configured such that placement of the leg of the carpenter's square within the slot with a leg edge against the slot end surface positions the leg edge parallel to and coplanar with the first and second abutment front surfaces and placement of the ledge on a workpiece with either the first or second ledge surface against a workpiece surface and either the respective first or second abutment front surface against an adjacent workpiece edge aligns the square leg edge with the workpiece edge at a desired location, rendering the carpenter's square accurate and versatile in multiple uses.

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1:
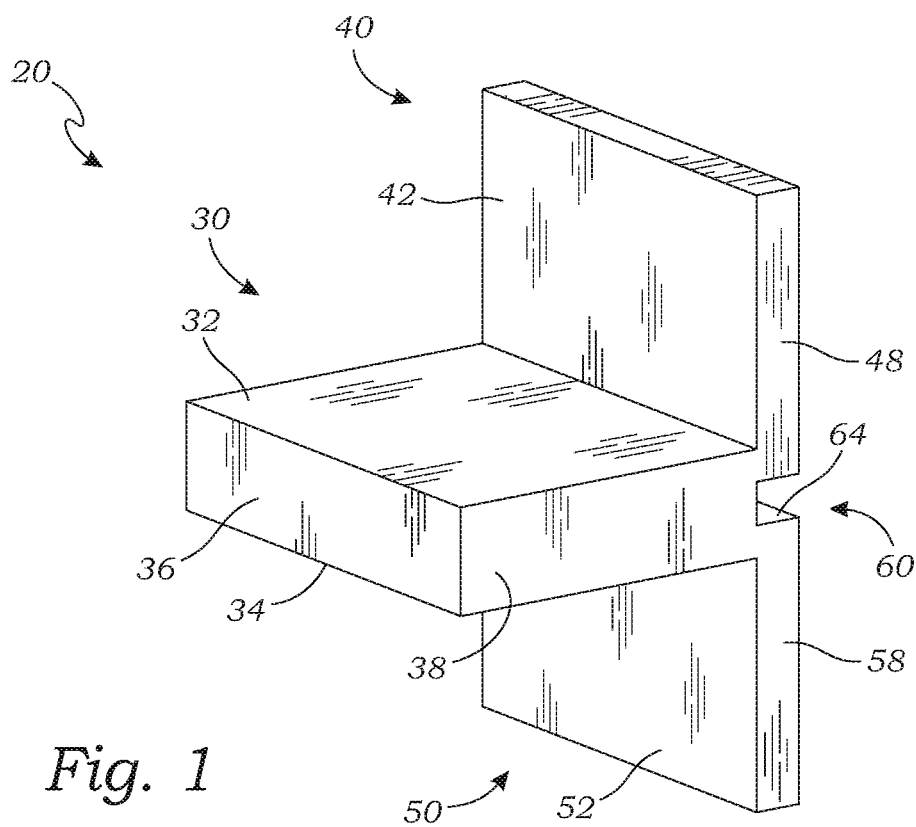
FIG. 1 is a perspective view of an exemplary square gauge apparatus, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention and its components or features unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of the claims.

Figure 2:
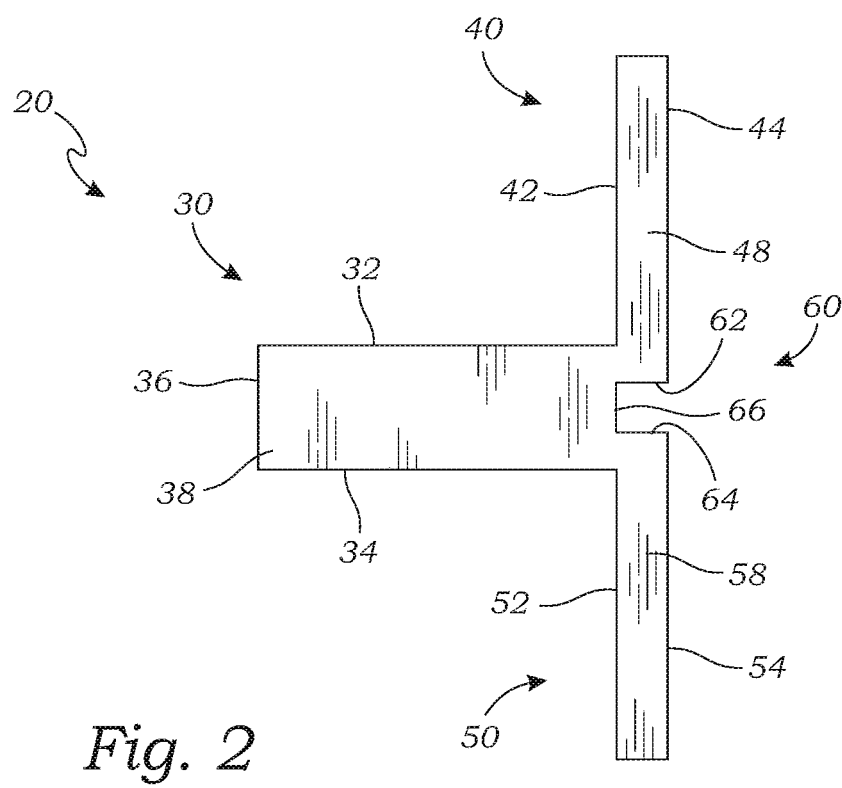
FIG. 2 is a side view thereof, in accordance with at least one embodiment.
Figure 3:
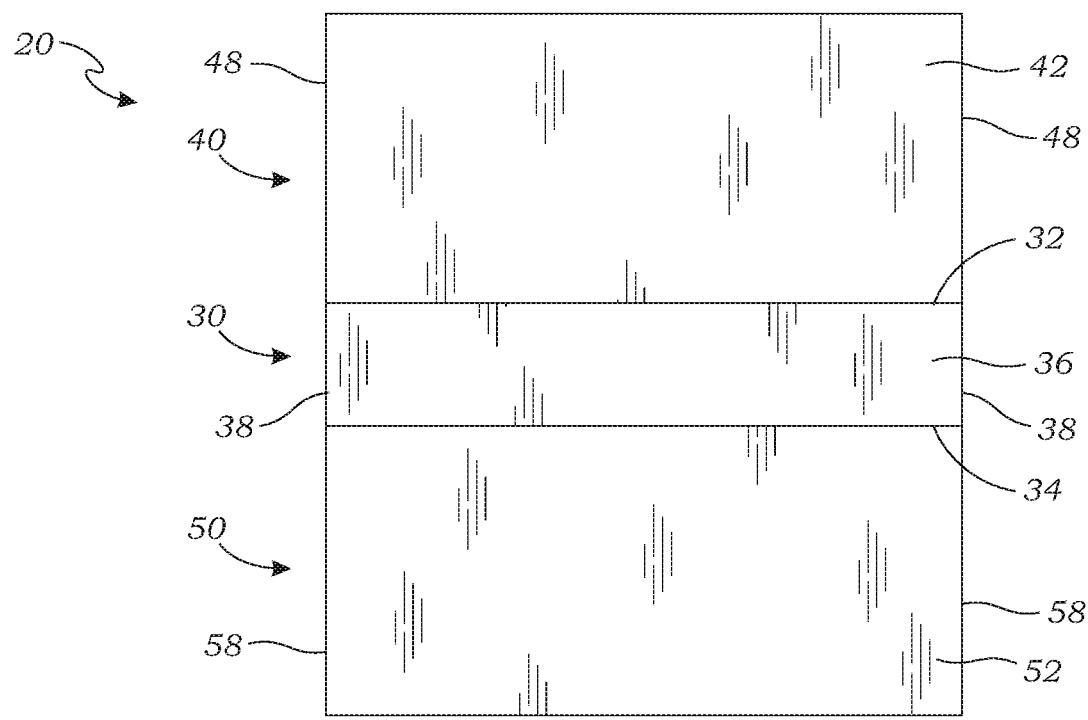
FIG. 3 is a front view thereof, in accordance with at least one embodiment.

Turning now to FIGS. 1-3, there are shown perspective, side, and front views of an exemplary embodiment of a square gauge apparatus 20 according to aspects of the present invention. The apparatus 20 comprises, in the exemplary embodiment, a forward-projecting ledge 30, opposite first and second abutments 40, 50 extending perpendicularly from opposite ledge first and second surfaces 32, 34, respectively, and a rearward-opening slot 60 formed in or adjacent to the ledge 30 opposite of the ledge end surface 36. Particularly the opposite ledge first and second surfaces 32, 34 and the respective adjoining first and second abutment front surfaces 42, 52 are substantially planar and are perpendicular to one another—substantially planar in that such surfaces could be slotted or ribbed while still defining a contact surface or surfaces that is or are planar in terms of defining points, lines, or surfaces that lie in a common plane for purposes of abutting or being placed against a workpiece W (FIG. 6), more about which is said below. More generally, while the exemplary apparatus 20 is shown as being formed of a single piece of material and being substantially symmetrical and having all planar and squared surfaces meet at right angles with all corners between adjoining or adjacent surfaces not having corner breaks (chamfers or fillets), those skilled in the art will appreciate that such is merely illustrative and non-limiting. Indeed, it will be appreciated that such a square gauge apparatus 20 can take a variety of forms, whether or not formed of a single material or unitary construction and whether or not being symmetrical, without departing from the spirit and scope of the invention, as will be further appreciated with reference to the alternative exemplary embodiments disclosed herein.

Notably, as best seen in the side view of FIG. 2, the slot 60 is formed in the square gauge apparatus 20 such that the slot end surface 66 is both parallel to and vertically aligned with the respective first and second abutment front surfaces 42, 52, such that as will be further appreciated from the below discussion in connection with FIGS. 4-6, such configuration of the slot 60 thus serves to position an edge of a leg of a carpenter's square S (FIGS. 7-9) also parallel to and vertically aligned with the first and second abutment front surfaces 42, 52 of the square gauge 20, which is highly beneficial in use. While the ledge end surface 36 is also shown as being substantially planar and parallel to the slot end surface 66, such is not necessarily so, the ledge end surface 36 being able to take a number of forms without departing from the spirit and scope of the invention. The slot 60 is also formed so as to be substantially centered within the ledge 30 or having the opposite slot first and second surfaces 62, 64 inset and substantially equidistant from and parallel to the respective ledge first and second surfaces 32, 34, which it will be appreciated in use then squares or renders parallel the inserted leg L of a carpenter's square S (FIGS. 4-9) with the respective ledge first and second surfaces 32, 34, which is also highly beneficial in use. Those skilled in the art will appreciate that by so configuring and orienting the slot 60 within a square gauge 20 according to aspects of the present invention and particularly with the slot 60 parallel to or square with both the ledge first and second surfaces 32, 34 that extend horizontally and the first and second abutment front surfaces 42, 52 that extend vertically, the gauge 20 thus provides for or serves as both a horizontal extension of the width of a leg L of a carpenter's square S as to enable placement of the carpenter's square S on a surface of a workpiece W (FIGS. 6-9) and a vertical extension of the thickness of a leg L of a carpenter's square S at an edge of the leg L, thereby effectively converting a traditional carpenter's square S into an enlarged try square or speed square of sorts, again, more about which is said below.

(FIGS. 6-9) and a vertical extension of the thickness of a leg L of a carpenter's square S at an edge of the leg L, thereby effectively converting a traditional carpenter's square S into an enlarged try square or speed square of sorts, again, more about which is said below.

Dimensionally, and by way of illustration and not limitation, the exemplary square gauge apparatus 20 may be formed such that the overall width across both the ledge 30 and the first and second abutments 40, 50 is one-and-a-half inches (1½ in.), or the distance between respective opposite ledge side surfaces 38, first abutment side surfaces 48, and second abutment side surfaces 58. It will thus be appreciated that in the exemplary embodiment the ledge, first abutment, and second abutment side surfaces 38, 48, 58 are substantially continuous for an effectively singular side surface on opposite sides of the gauge 20, again with such a span or width being one-and-a-half inches (1½ in.) corresponding to standard "two by" lumber, it being known that the thickness of typical 2"×4", 2"×6", 2"×12" lumber, etc. is a nominal one-and-a-half inches (1½ in.), thus conveniently allowing for marking both sides of stud, joist, and rafter placement locations. The exemplary square gauge 20 may also be formed such that both the ledge 30 and the first and second abutments 40, 50 are three-quarter inch (¾ in.) long, the first and second abutments 40, 50 extending roughly three-quarter inch (¾ in.) vertically from the respective ledge first and second surfaces 32, 34, with either such abutment 40, 50 oriented downwardly so as to abut an edge of a workpiece W (FIGS. 6-9) thus being sufficient to span most such material despite any rounding, voids, or other irregularities along such workpiece edge, and with the ledge 30 extending roughly three-quarter inch (¾ in.) horizontally, such is sufficient both for marking and for supporting the gauge 20 and thus any engaged carpenter's square S on the workpiece W. Fundamentally, it will be appreciated by those skilled in the art that all such dimensions are illustrative of features and aspects of the present invention and are expressly non-limiting. By way of further illustration and not limitation, it is again noted that while the exemplary square gauge apparatus 20 is shown and described as being symmetrical, such as in that the first and second abutments 40, 50 are the same length, that is not required, and in alternative embodiments it may be preferable to have one abutment 40, 50 be longer than the other, for example, such as to perhaps better accommodate different types or thicknesses of boards or other materials that are to be marked and cut depending on which abutment 40, 50 is oriented downwardly so as to be adjacent to the workpiece W. Once more, a variety of other configurations of such a square gauge apparatus 20 according to aspects of the present invention is possible without departing from its spirit and scope.

Figure 4:
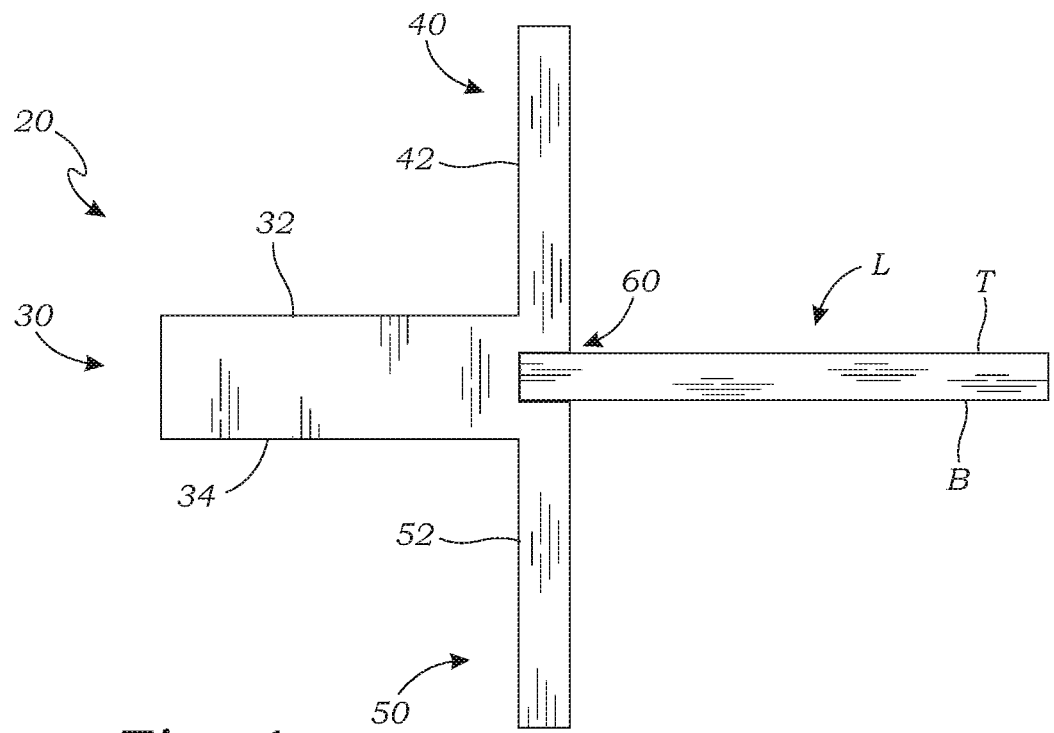
FIG. 4 is a side view thereof with a leg of a carpenter's square engaged therewith, in accordance with at least one embodiment.
Figure 5:
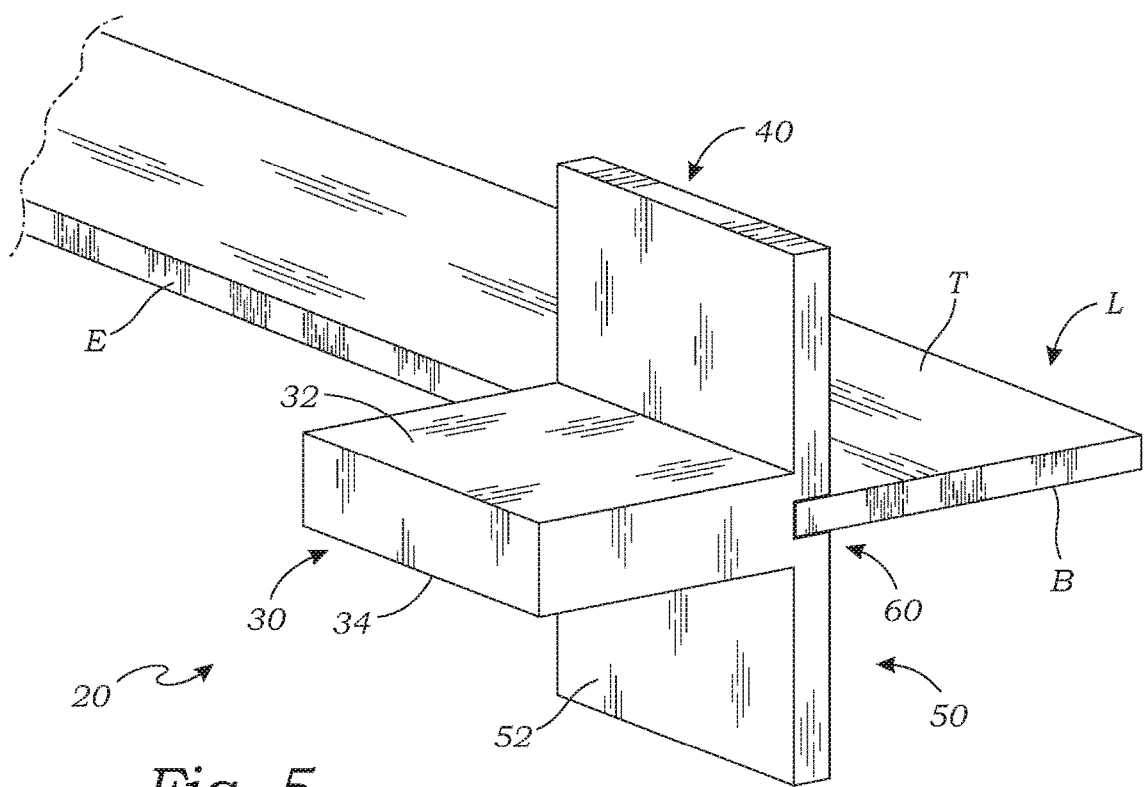
FIG. 5 is a perspective view thereof with a leg of a carpenter's square engaged therewith, in accordance with at least one embodiment.

Further, with continued reference to FIGS. 1-3 and now also to FIGS. 4 and 5 illustrating a leg L of a carpenter's square S (FIGS. 7-9) secured within the slot 60 formed in the square gauge apparatus 20 opposite the forwardly-extending ledge 30 and between the opposite vertically-extending abutments 40, 50, the width of the slot 60, or the normal distance between the slot first and second surfaces 62, 64, is to be sufficient to accommodate the typical thickness of the leg L of a carpenter's square S, or on the order of an eighth inch (⅛ in.), though may be greater or less depending on a number of factors, including the means by which the leg L is to be secured within the slot 60 and of course the size or thickness of the carpenter's square S and its legs L, which will be further appreciated with reference to the alternative exemplary embodiments of FIGS. 10-15 discussed further below. In the exemplary embodiment of FIGS. 1-6, a leg L of a carpenter's square S may be secured within the slot 60 of the square gauge 20 as by a frictional or net fit, which it will be appreciated may be facilitated by forming the gauge 20, in whole or in part, from a resilient material that allows some flex or "spring" at the slot 60 so as to be selectively opened for receipt of the carpenter's square leg L and selectively released to then effectively clamp onto the leg L, the slot 60 and surrounding material in this configuration and use thereby forming or serving as a "living hinge." Even without such flex or the like, those skilled in the art will appreciate that a net or slight interference fit of the slot 60 along the leg L of a carpenter's square S would still serve to selectively frictionally secure the gauge 20 thereon. To further facilitate such retention particularly where the carpenter's square S is steel or other ferrous metal or material, an optional magnet may be formed or installed within the gauge 20, or more particularly within or adjacent to the slot 60. It will be appreciated that in order for any such slot 60 to extend to a depth substantially aligned with the first and second abutment front surfaces 42, 52, the ledge 30 must be thicker than the slot 60 is wide—in the exemplary embodiment the ledge 30 is approximately one-quarter inch to three-eighths inch (¼-⅜ in.) thick, as compared to an exemplary slot 60 again having a nominal width of an eighth inch (⅛ in.). Those skilled in the art will once again appreciate that all such dimensions are illustrative of features and aspects of the present invention and are expressly non-limiting, with a variety of other configurations of such a square gauge apparatus 20 according to aspects of the present invention being possible without departing from the spirit and scope of the invention.

In forming a square gauge apparatus 20 according to aspects of the present invention, in connection with any exemplary embodiment disclosed herein or any other such configurations within its spirit and scope, and whether formed of a single or multiple components, it will be appreciated that any appropriate materials and methods of construction now known or later developed may be employed, including but not limited to metals such as steel, aluminum, alloys, and the like and a variety of plastics such as polypropylene, polystyrene, polyvinyl chloride ("PVC"), acrylonitrile butadiene styrene ("ABS"), polyethylenes such as high density polyethylene ("HDPE") and low density polyethylene ("LDPE"), polycarbonate, polyurethane, and other such plastics, thermoplastics, thermosetting polymers, and the like, any such components being fabricated or formed as through injection molding, casting, extrusion, machining, stamping, forming, or any other such technique now known or later developed. Relatedly, such components may be formed integrally or may be formed separately and then assembled in any appropriate secondary operation employing any assembly technique now known or later developed, including but not limited to fastening, bonding, welding, over-molding or coining, press-fitting, snapping, or any other such technique now known or later developed. Any such components, particularly those made of metal, may also be subjected to surface treatment in a secondary operation, including but not limited to polishing, anodizing, painting, dip coating, and any other such surface treatment or application now known or later developed. Those skilled in the art will fundamentally appreciate that any such materials and methods of manufacture are encompassed within the scope of the invention, any exemplary materials and methods in connection with any and all embodiments thus being illustrative and non-limiting.

Figure 6:
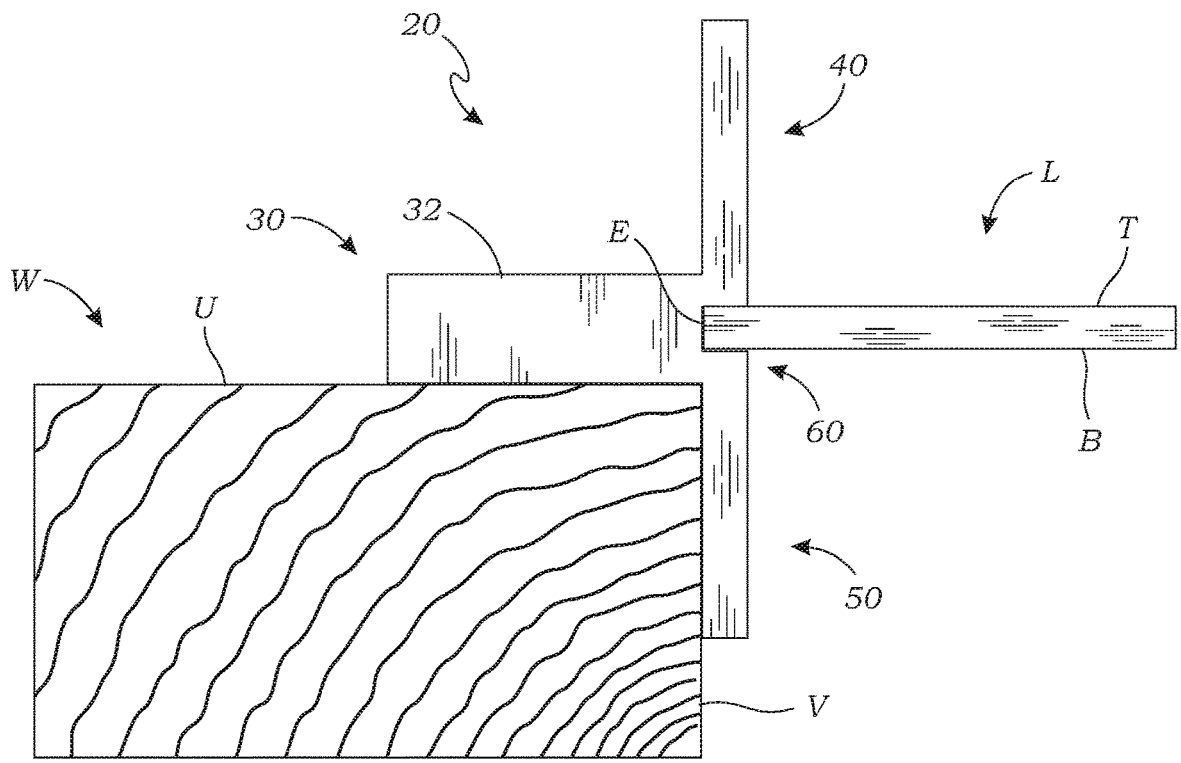
FIG. 6 is a side view thereof with a leg of a carpenter's square engaged therewith and positioned on a workpiece, in accordance with at least one embodiment.

Turning next to FIG. 6, a square gauge apparatus 20 according to FIGS. 1-3 and having a leg L of a carpenter's square S (FIGS. 7-9) inserted into the slot 60 thereof as shown in FIGS. 4 and 5 is now placed on a workpiece W as in use for marking the workpiece W for one or more cuts or layout lines. From this side view of FIG. 6 it can be seen that with the ledge 30 of the gauge 20 and specifically the bottom ledge second surface 34 positioned on or adjacent the upper surface U of the workpiece W and the bottom or second abutment 50 and specifically the second abutment front surface 52 positioned against or adjacent the edge surface V of the workpiece W, the near edge E of the leg L of the carpenter's square S having been fully seated within the slot 60 and thus substantially against or adjacent to the slot end surface 66, the edge E of the square leg L is thus vertically aligned with the second abutment front surface 52 and hence the edge surface V of the workpiece W. Accordingly, it will be appreciated that the other right angle leg of the square S, which is not shown in FIG. 6 for simplicity but would extend over the upper surface U of the workpiece W, such as in the use illustrated in FIG. 7, would still reflect accurate measurements therealong back to the edge E of the leg L on which the square gauge 20 is installed and thus back to the edge V of the workpiece W. While only one such square gauge 20 is shown as installed on the leg L in FIG. 5, it will be appreciated that two or more such gauges 20 may be installed on one or both legs L of the square S, again with reference to FIGS. 7-9, for example. Also, while in FIG. 5 the square gauge 20 is shown as installed substantially at a free end of a leg L of a carpenter's square S, such is not required and in fact in most cases each gauge 20 would be installed at a desired intermediate location along a leg L, such as at a particular distance from the elbow of the square S or at a particular dimensional marking on the square's scale (not shown), again, to suit a particular carpentry purpose in terms of marking and cutting a workpiece W. And regarding the workpiece W, while such is shown as representative of a piece of wood or lumber having a particular grain, or a board approximating a common "two-by-four," such is not at all required, and indeed a virtually infinite variety of materials in terms of type and size and shape may be employed or marked for cutting employing a square gauge apparatus 20 and method of use according to aspects of the present invention, which is not at all limited to particular sizes of the gauge 20 or any carpenter's square S or workpiece W with which such a gauge 20 is employed. Once again, the exemplary symmetrical three-quarter inch (¾ in.) sizes of the ledge 30 and opposite abutments 40, 50 are illustrative and non-limiting. Those skilled in the art will appreciate that regardless, by having oppositely-extending and substantially co-planar abutments 40, 50 whether or not the opposite abutments 40, 50 are symmetrical or substantially equally sized, the square gauge 20 can thus be used in either orientation or "flipped" as needed, such as by having the first abutment 40 oriented down and the second abutment 50 oriented up. Moreover, this can be done even while the one or more gauges 20 are installed on a carpenter's square S or other such tool, enabling the entire tool to be used in alternative orientations or to be "flipped" without having to reposition the one or more gauges 20, more about which is said below once again in connection with FIGS. 7-9. As also appreciated from the side view of FIG. 6, the top and bottom surfaces T, B of the square leg L are parallel with the ledge top and bottom or first and second surfaces 32, 34 and thus with the upper surface U of the workpiece W. Those skilled in the art will further appreciate from the foregoing and again with reference to FIG. 6 that the square leg L and specifically its bottom surface B is slightly elevated from the upper surface U of the workpiece W, again due to the ledge 30 being thicker than the slot 60 is wide so as to allow the depth of the slot 60 to be aligned with the first and second abutment front surfaces 42, 52. Taking the above illustrative dimensions wherein the ledge is one-quarter inch to three-eighths inch (¼-⅜ in.) thick while the slot 60 has a nominal width and the leg L of the square S has a nominal thickness of an eighth inch (⅛ in.), it follows that the bottom surface B of the leg L is elevated above the upper surface U of the workpiece W by approximately a sixteenth inch to an eighth inch (1/16-⅛ in.), which is negligible over lengths of up to sixteen to twenty-four inches (16-24 in.) or more when it comes to the portions of the square S overlying the workpiece upper surface U for marking.

Figure 7:
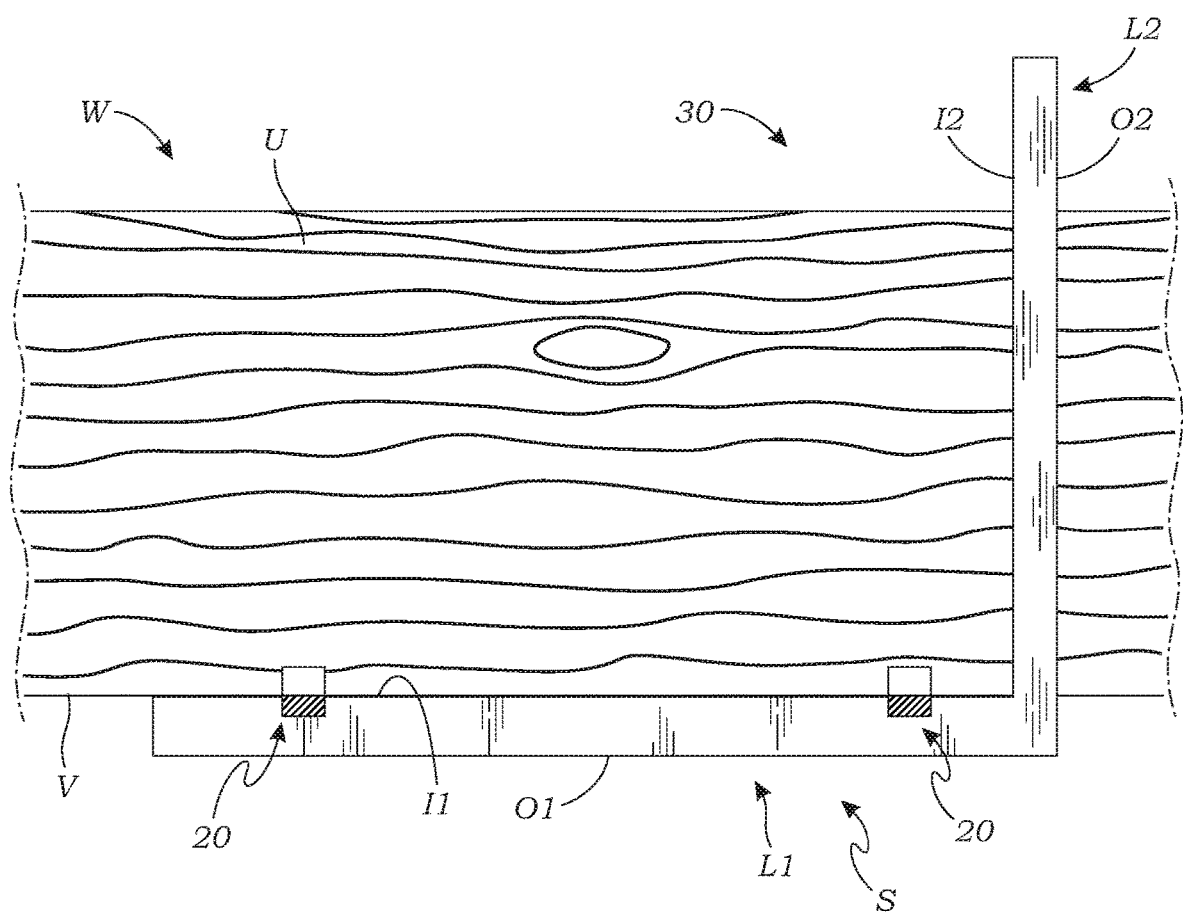
FIG. 7 is a top schematic view of two exemplary square gauge apparatuses installed on a carpenter's square in a first operational mode, in accordance with at least one embodiment.
Figure 8:
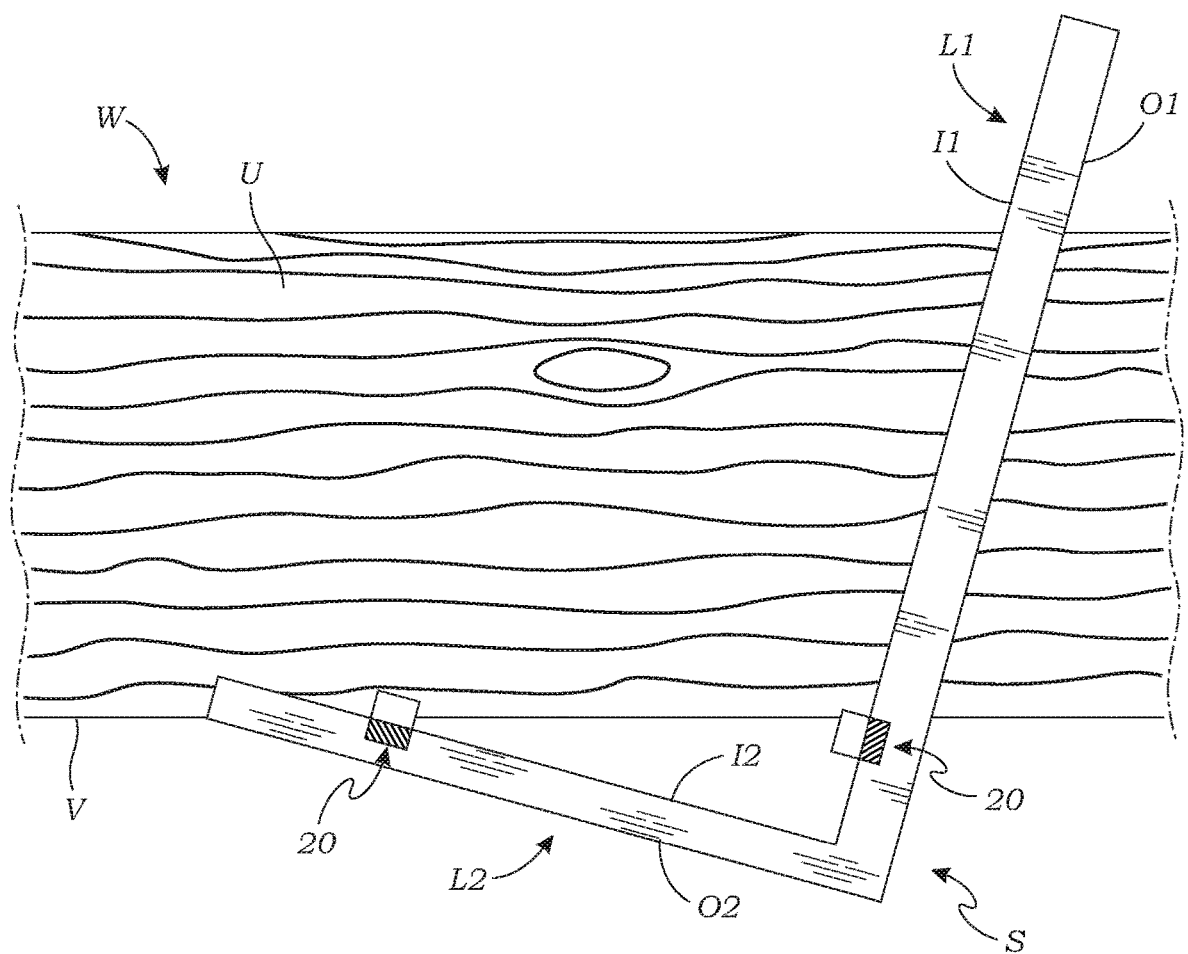
FIG. 8 is a top schematic view of two exemplary square gauge apparatuses installed on a carpenter's square in a second operational mode, in accordance with at least one embodiment.
Figure 9:
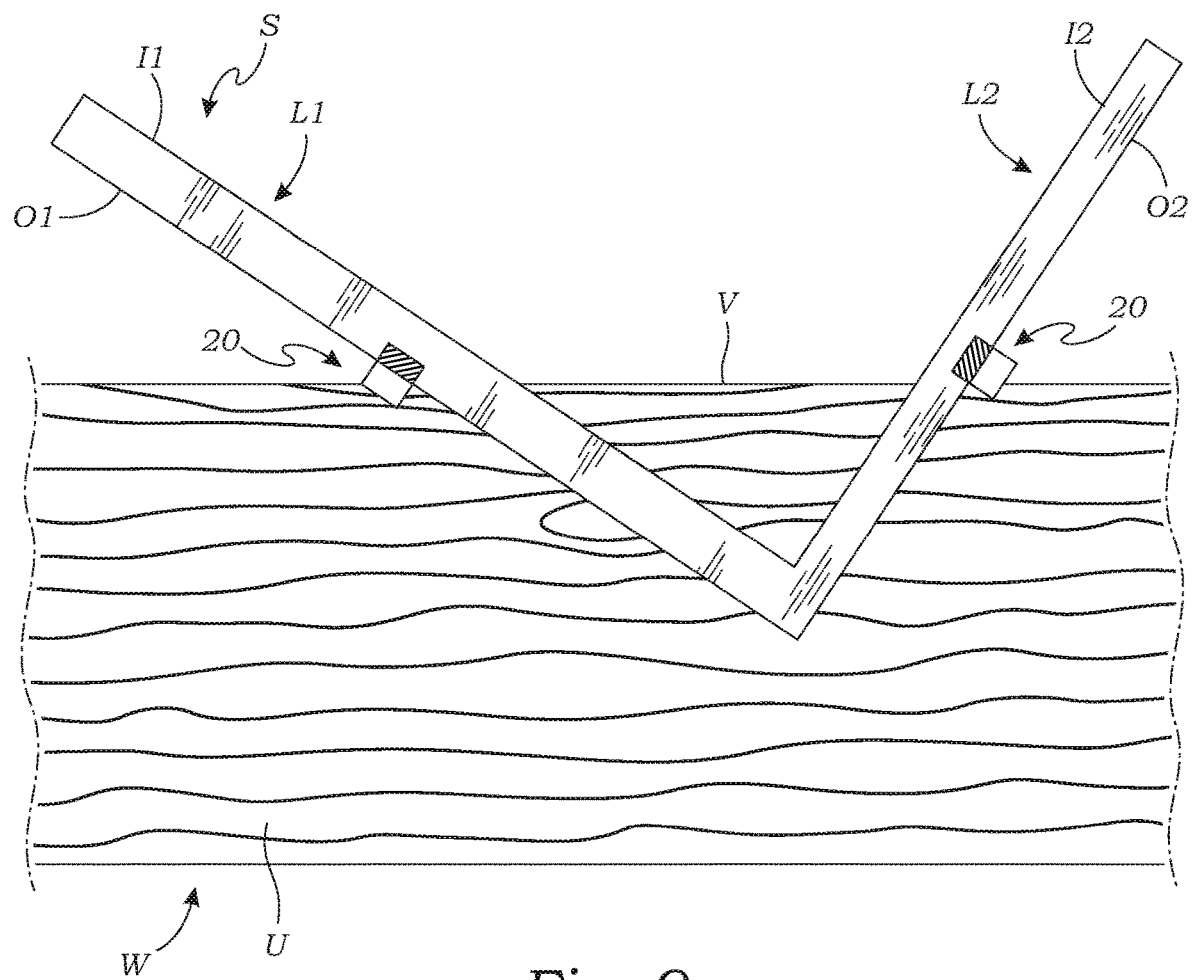
FIG. 9 is a top schematic view of two exemplary square gauge apparatuses installed on a carpenter's square in a third operational mode, in accordance with at least one embodiment.

Referring next to FIGS. 7-9, there are illustrated three exemplary uses or operational modes of a set of square gauges 20 according to aspects of the present invention in conjunction with a carpenter's square S for marking a workpiece W for a particular purpose. Those skilled in the art will appreciate that a wide variety of uses beyond those shown and described are possible according to aspects of the present invention without departing from its spirit and scope, as are numerous variations within each illustrated use, such as with regard to the number and locations of the square gauges 20 along the leg(s) L of the square S. As a threshold matter, the non-hatched or solid portion of each schematic representation of a gauge 20 in FIGS. 7-9 is to indicate the ledge 30 (FIGS. 1-6) that projects forwardly and rests at least partially on the upper surface U of the workpiece W, while the hatched portion of each schematic representation of a gauge 20 is to indicate that portion of the gauge 20 that is not visible beneath the square S and particularly the downwardly-extending first or second abutment 40, 50 (FIGS. 1-6), as the case may be, that is in contact with the edge surface V of the workpiece W. Generally, it will be appreciated that with the edge E of the square leg L aligned with the abutting edges 42, 52 of the respective abutments 40, 50 as herein described, this allows the gauges 20 effectively one hundred-eighty degrees (180°) of rotation or coverage while either one edge 42, 52 of the respective abutment 40, 50 is in contact with the lumber or other workpiece W. One edge 42, 52 can be positioned to line up at a precise measurement point on the square S and maintain that exact pivot point over a ninety degree (90°) area, such that then positioning the gauge 20 on the opposite edge 40, 50 would cover the other ninety degree (90°) area, or a one hundred eighty degree(180°) total area.

First, with reference to FIG. 7, there are shown a pair of square gauges 20 attached to the first or larger leg L1 of a carpenter's square S for the purpose of aligning the second or smaller leg L2 at ninety degrees (90°) or perpendicular to the lengthwise edge V of the workpiece W to mark a transverse line or cut at a desired location along the workpiece W. Once again, due to the configuration of each square gauge 20 according to aspects of the present invention, it will be appreciated that the carpenter's square S itself is thus square with the workpiece W in this orientation, with the inside edge I1 of the first leg L1 vertically aligned with and parallel to the edge V of the workpiece W and thus with the second leg L2 perpendicular to edge V and any markings or scale (not shown) along the second leg L2 being true measurements from the edge V of the workpiece W, in much the same way as a smaller try square. The side surfaces 38 particularly of the ledge 30 of the gauge 20 also being perpendicular to the edge V of the workpiece W and parallel with the square's second leg L2 facilitates marking repetitive cuts and simply incrementally moving the square S along the workpiece W to each successive mark as appropriate. And as noted previously, in this use with the carpenter's square S so equipped with two gauges 20 along one leg, here the larger leg L1, those skilled in the art will appreciate that the square S effectively may be placed or positioned on the workpiece W as shown "hands free," the square S being held in place or supported by the two gauges 20 and particularly by the ledges 30 thereof seated on the workpiece upper surface W. And with the width of both the smaller leg L2 of the square S and of the illustrated gauges 20 themselves being one-and-a-half inches (1½ in.), it will be appreciated that both sides of a typical stud or "two-by" piece of lumber can be marked for stud placement and other purposes as by marking along either or both the inside and outside edges I2, O2 of the second leg L2 and/or the opposite sides 38 of the ledge 30 of the square gauge 20 as desired. And due to the symmetry of the gauges 20, it will be further appreciated that the square S as configured with two gauges 20 along its larger leg L1 as shown can simply be flipped, with the larger leg L1 still running along the same edge V of the workpiece W but now with the smaller leg L2 positioned at the left rather than at the right as viewed in FIG. 7, so as to enable, for example, marking a line or cut near the left end of the workpiece W. As such, the versatility and benefits of such a carpenter's square S configured with gauges 20 according to aspects of the present invention are unmistakable.

Turning to FIG. 8, along with continued reference to FIGS. 1-6, there is shown a further top schematic view of an alternative use of square gauges 20 according to aspects of the present invention in conjunction with a standard carpenter's square S, here with one gauge 20 on each leg L in a way for marking an angled line or cut on the workpiece W, such as for "rise and run" rafter layouts or end cuts. One gauge 20 is thus installed on the inside edge I1 of the first or larger leg L1 of the square S and one on the inside edge I2 of the second or smaller leg L2, meaning that the ledges 30 of the respective gauges 20 each extend away from the inside edges I1, I2 of the respective legs L1, L2. In the illustrated use, the "rise" gauge placement, or the position along a leg L relatively closer to the heel of the square S, is on the larger leg L1 and the "run" gauge placement, or the position along a leg L relatively further from the heel of the square S, is along the smaller leg L2, though it will be appreciated that such can just as easily be reversed—the typical "run" in rafter contexts being twelve inches (12 in.), it follows that either leg L of a typical carpenter's square S can thus accommodate the "run" dimension. With the square S so configured, it can be placed as desired on the upper surface U of the workpiece W, again in either orientation—with the larger leg L1 extending up and to the right as illustrated or up and to the left, or of course down and to the right or left if working from the opposite edge of the workpiece W—once more due to the symmetry of the gauges 20, and lines then marked for the "peak cut," "bird's mouth," and "tail cut" in the rafter layout context or any other such lines for desired markings or cuts on the workpiece W. Notably, those skilled in the art will appreciate that the outside edges 38, 48, 58, or the edges of each gauge 20 furthest from the square's heel, being set at the desired "rise" and "run" distances along each leg L1, L2 and such edges 38 of the ledge 30 at the actual inside edges I1, I2 of the square S being precisely vertically aligned with the edge 48, 58 of the respective abutment 40, 50 that is in contact with the edge V of the workpiece W, the locations on the workpiece upper surface U are precisely located along the respective outside edges 38 of the ledge 30 of the gauge 20 as partially overlaying the upper surface U—that is, the edge 38 along the outside portion of each gauge ledge 30 that is to be marked fully overlays the workpiece upper surface U even while some portion of the ledge 30 does not, allowing precise placement for each "rise" and "run" line or cut to then be marked along upper surface U starting precisely at the vertical surface V of the workpiece W.

Next referring to FIG. 9, still with continued reference to FIGS. 1-6, there is shown a top schematic view of a further alternative use of square gauges 20 according to aspects of the present invention now as "stair gauges" in conjunction with a carpenter's square S, again with one gauge 20 on each leg L and here for marking angled "rise" and "run" or "riser" and "tread" lines or cuts on the workpiece W such as for stair jack or stringer layouts. One gauge 20 is thus installed here on the outside edge O1 of the first or larger leg L1 of the square S and one on the outside edge O2 of the second or smaller leg L2, meaning that the ledges 30 of the respective gauges 20 each extend away from the outside edges O1, O2 of the respective legs L1, L2. In the illustrated use, the "riser" gauge placement, or the position along a leg L relatively closer to the heel of the square S, is on the smaller leg L2 and the "tread" gauge placement, or the position along a leg L relatively further from the heel of the square S, is along the larger leg L1, though it will again be appreciated that such can just as easily be reversed—the typical "riser" and "tread" dimensions in stair stringer contexts being seven to eight inches (7-8 in.) and ten to twelve inches (10-12 in.), respectively, it follows that either leg L of a typical carpenter's square S can thus easily accommodate either the "tread" or "riser" dimension. With the square S so configured, it can be placed as desired on the upper surface U of the workpiece W, again in any appropriate orientation due to the symmetry of the gauges 20, and lines then marked for the "tread" and "riser" of each successive step accordingly as by simply tracing the outside edges O1, O2 of the respective square legs L1, L2 between the two gauges 20. Notably, as in the rafter context of FIG. 8, those skilled in the art will appreciate that here the inside edges 38, 48, 58, or the edges of each gauge 20 closest to the square's heel, being set at the desired "tread" and "riser" distances along each leg L1, L2 and such edges 38 of the ledge 30 at the actual outside edges O1, O2 of the square S being precisely vertically aligned with the edge 48, 58 of the respective abutment 40, 50 that is in contact with the edge V of the workpiece W, the locations on the workpiece upper surface U are precisely marked along the respective outside edges O1, O2 of the square S. Furthermore, the inside edge 38 of the ledge 30 of the gauge 20 as being perpendicular to the respective leg L1, L2 thus provides the exact location for the next stair tread or riser location in succession for the stair stringer, enabling the square S to be slid along or repositioned on the workpiece W as by essentially moving one gauge 20 to where the other gauge 20 previously was and thus aligning the inside edge 38 of the second gauge 20 with the mark previously made along the outside edge O2 of the square S and simultaneously aligning the outside edge O1 of the square S with the perpendicular mark previously made along the inside edge 38 of the first gauge 20, with this process simply being repeated until the desired number of steps are marked out on the workpiece W as a stair jack or stringer layout for cutting. Again, each gauge ledge 30 partially overlaying the upper surface U such that the edge 38 here along the inside portion of each ledge 30 that is to be marked or to represent the "inside corner" of each step fully overlays the workpiece upper surface U even while some portion of the ledge 30 does not, allowing a full and extremely precise mark for each successive "tread" and "riser" line.

Figure 10:
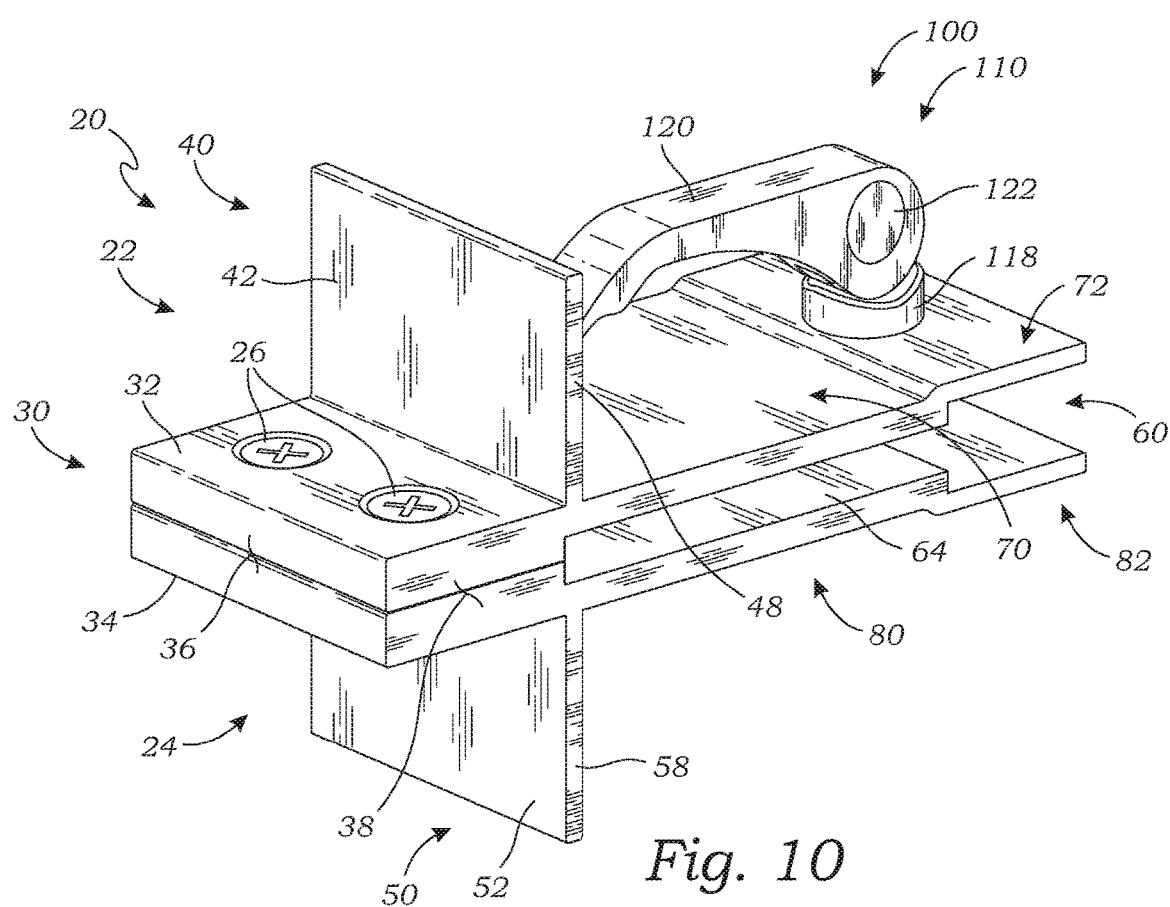
FIG. 10 is a perspective view of an alternative exemplary square gauge apparatus, in accordance with at least one embodiment.
Figure 11:
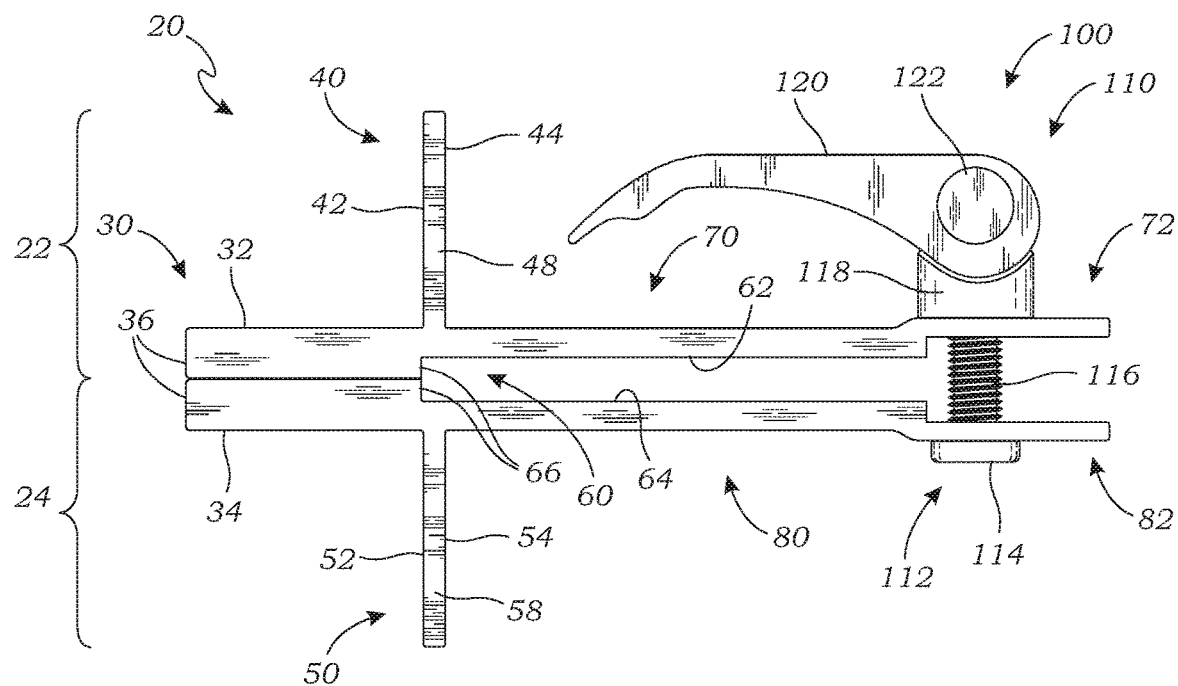
FIG. 11 is a side view thereof, in accordance with at least one embodiment.

Turning to FIGS. 10 and 11, there are shown perspective and side views of an alternative exemplary embodiment of a square gauge apparatus 20 according to aspects of the present invention. The exemplary apparatus 20 again comprises a forward-projecting ledge 30, opposite first and second abutments 40, 50 extending perpendicularly from opposite ledge first and second surfaces 32, 34, respectively, and a rearward-opening slot 60 formed in or adjacent to the ledge 30 opposite of the ledge end surface 36. Particularly the opposite ledge first and second surfaces 32, 34 and the respective adjoining first and second abutment front surfaces 42, 52 are substantially planar and are perpendicular to one another—substantially planar again in that such surfaces could be slotted or ribbed while still defining a contact surface or surfaces that is or are planar in terms of defining points, lines, or surfaces that lie in a common plane for purposes of abutting or being placed against a workpiece W (FIGS. 7-9). Here, the apparatus 20 is shown as being formed of two symmetrical or mirror-image components, an upper first portion 22 and a lower second portion 22, the "upper" being associated only with the orientation of the gauge 20 as illustrated, it being appreciated once again that the gauge 20 can also be employed inverted or flipped, such that any such "upper" and "lower" descriptors throughout the application are to be understood as for ease of identification with reference to the figures and not limitation. Fundamentally, it will be appreciated that the alternative exemplary apparatus 20 of FIGS. 10 and 11 may instead be formed of a single piece of material. Either way, and as set forth elsewhere herein, the construction of the gauge 20 may employ any appropriate material(s) and manufacturing method(s) now known or later developed. Staying with the alternative illustrated embodiment wherein the gauge 20 is formed of two offset assembled portions 22, 24, as shown, the upper first portion 22 would comprise an upper half of the ledge 30 and thus the upper ledge first surface 32 and the lower second portion 24 would comprise a lower half of the ledge 30 and thus the lower ledge second surface 34, with the two portions at the end of the ledge 30 together defining the ledge end surface 36 in this example. As illustrated, the first and second portions 22, 24 may be assembled in the area of the ledge 30 via two screws or other fasteners 26. The upper first portion 22 would also comprise the upper first abutment 40, and the lower second portion 24 would also comprise the lower second abutment 50. Further, as distinct from the exemplary embodiment of FIGS. 1-6, the slot 60 formed in the alternative gauge 20 is relatively longer and is defined at least in part or even substantially by opposite somewhat parallel, spaced-apart first and second clamp legs 70, 80 that extend rearwardly from the ledge 30 and the respective first and second abutments 40, 50. It is indicated that the clamp legs 70, 80 are or may be "somewhat parallel" in that in some exemplary embodiments they may be slightly diverging distally or away from the abutments 40, 50 when unloaded or "at rest" so as to allow for some flex when tightened or clamped down on a leg L of the carpenter's square S (FIGS. 7-9), thereby assisting with insertion or removal of the leg L from the square gauge 20 and potentially more uniform clamping pressure on the square's leg L; accordingly, it will be appreciated that the view of particularly FIG. 11 may be appreciated as being with the gauge 20 and particularly the opposite clamp legs 70, 80 "loaded" or with the clamp device 100 tightened or "unloaded" or with the clamp device 100 not tightened. More particularly, as part of the upper first portion 22, the upper first clamp leg 70 extends substantially parallel to the ledge 30, and specifically the upper ledge first surface 32, and substantially perpendicular to the upper first abutment 40, and specifically the first abutment back surface 44, and the lower second clamp leg 80 extends substantially parallel to the ledge 30, and specifically the lower ledge second surface 34, and substantially perpendicular to the lower second abutment 50, and specifically the second abutment back surface 54. Interior offset slot first and second surfaces 62, 64 of the respective first and second clamp legs 70, 80 together form or define the slot 60 terminating forwardly in notched portions of the respective upper first and lower second portions 22, 24 so as to define the slot end surface 66 again parallel and vertically aligned with the first and second abutment front surfaces 42, 52. While in FIG. 10 the widths of the first and second portions 22, 24 are shown as substantially constant or the overall sides substantially planar, it will again be appreciated that such is not required. Particularly, it will be appreciated that the first and second clamp legs 70, 80 need not be of a continuous width and in fact may be substantially narrower or necked down from the "head" of the gauge 20 defined by the ledge 30 and the first and second abutments 40, 50, such that once more the configuration of the alternative exemplary square gauge apparatus 20 of FIGS. 10 and 11 is to be understood as illustrative of features and aspects of the present invention and non-limiting. Indeed, it will be appreciated that such a square gauge apparatus 20 can again take a variety of forms, whether or not formed of a single material or unitary construction and whether or not being symmetrical, without departing from the spirit and scope of the invention.

With continued reference to FIGS. 10 and 11, at roughly the rearward end of the alternative exemplary square gauge apparatus 20, there is illustrated a clamp device 100 for effectively securing the gauge 20 onto the leg L of a square S (FIGS. 12A and 12B) as by squeezing or clamping the opposite first and second clamp legs 70, 80 about or against a square leg L. As a threshold matter, it will again be appreciated by those skilled in the art that rather than employing any such clamp device 100, friction alone between the opposite inside surfaces 62, 64 of the notch 60 as here defined by the respective clamp legs 70, 80, whether such clamp legs 70, 80 are formed of metal or plastic or other material and regardless of the resiliency or flexibility of such components, and the top and bottom surfaces T, B of the leg L of the square S may be sufficient for retaining the gauge 20 on the square S in a desired location. Moreover, while particular exemplary clamp devices 100 are illustrated herein, those skilled in the art will appreciate that a wide variety of clamping, fastening, and other securement devices beyond those shown and described for selectively and temporarily retaining a leg L of a carpenter's square S within a square gauge 20 according to aspects of the present invention, whether now known or later developed, are possible without departing from its spirit and scope, as will be appreciated from the further alternative exemplary embodiments described below in connection with FIGS. 13A-15. Continuing with the illustrated clamp device 100 of FIGS. 10 and 11, there is shown a camming assembly 110 spanning the first and second clamp legs 70, 80 somewhat opposite of the ledge 30 and abutments 40, 50. As shown, there are even formed opposite first and second clamp leg stepped portions 72, 82 at the free ends of the first and second clamp legs 70, 80 so as to form a relatively wider gap therebetween, though such is illustrative and non-limiting. In any case, a camming screw 112 having a camming screw head 114 and a threaded camming screw body 116 passes through holes (not shown) in the opposite first and second clamp legs 70, 80 so as to span the gap therebetween. Specifically, the camming screw head 114 seats against the bottom second clamp leg 80 while the camming screw body 116 threadably engages a camming handle cross-pin 122 that is pivotally secured within a camming handle 120 that itself seats on a camming base 118 seated against the top first clamp leg 70 opposite the camming screw head 114. As such, it will be appreciated by those skilled in the art that by setting the tension on the camming assembly 110 as through rotation of either or both the camming screw 112 and the camming handle 120, the camming assembly 110 may thus be tightened down or clamped so as to then clamp down on a member such as a leg L of a square S that is positioned between the opposite first and second clamp legs 70, 80, as further described immediately below.

Figure 12A:
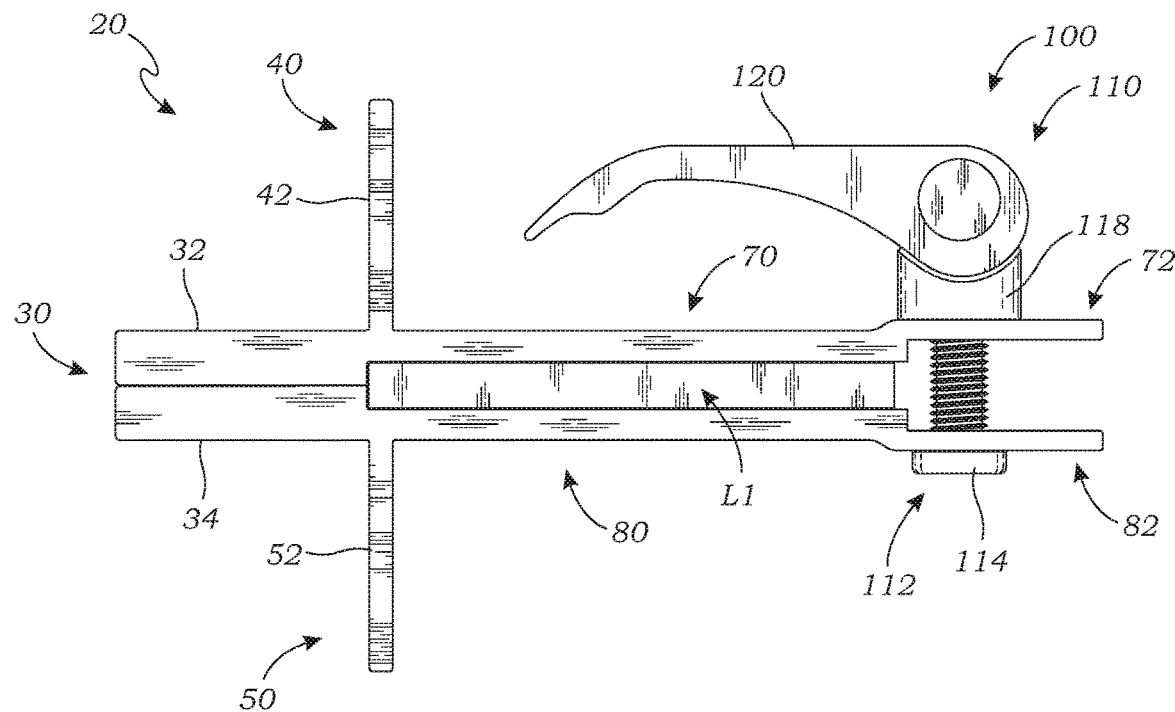
FIG. 12A is a side view thereof with a large leg of a carpenter's square engaged therewith, in accordance with at least one embodiment.
Figure 12B:
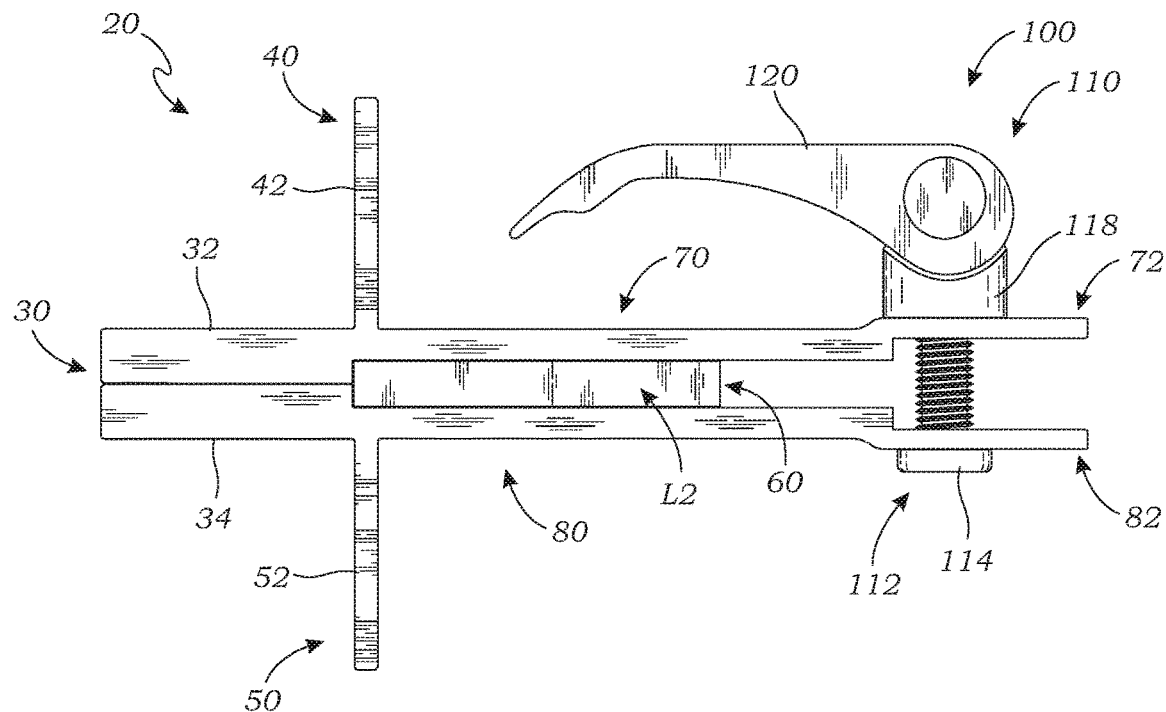
FIG. 12B is a side view thereof with a small leg of a carpenter's square engaged therewith, in accordance with at least one embodiment.

Referring next to FIGS. 12A and 12B, there are illustrated the alternative exemplary square gauge apparatus 20 of FIGS. 10 and 11 now in use on or in connection with either the relatively large first leg L1 or the relatively small second leg L2, respectively, of a typical carpenter's square S (FIGS. 7-9). In either case, it can be seen that the legs L1, L2 of the square S are selectively clamped between the opposed first and second clamp legs 70, 80 by operation of the clamp device 100 here configured as an illustrative camming assembly 110. It will be appreciated that as shown based on the lengths of the respective first and second clamp legs 70, 80 and the location of the camming assembly 110 and particularly the camming screw 112 near the free ends of the first and second clamp legs 70, 80 opposite the ledge 30, there is provided sufficient clearance therebetween for both the large and of course the small legs L1, L2 of the square S. As with the exemplary embodiment of FIGS. 1-6, particularly as shown and described in connection with FIGS. 4-6, the edge E of either leg L1, L2 is again to be abutted against or immediately adjacent to the slot end surface 66 so as to thus align the forward leg edge E vertically with the front surfaces 42, 52 of the respective first and second abutments 40, 50.

Figure 13A:
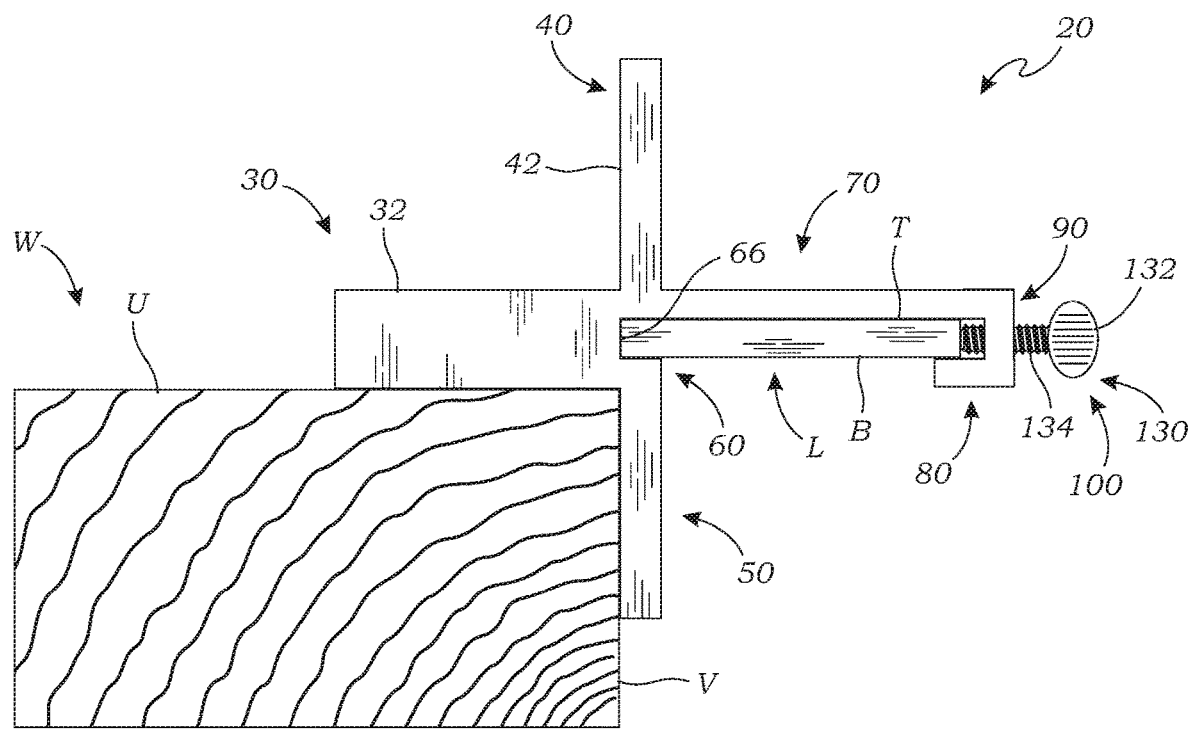
FIG. 13A is a side view of a further alternative exemplary square gauge apparatus with a leg of a carpenter's square engaged therewith and positioned on a workpiece, in accordance with at least one embodiment.
Figure 13B:
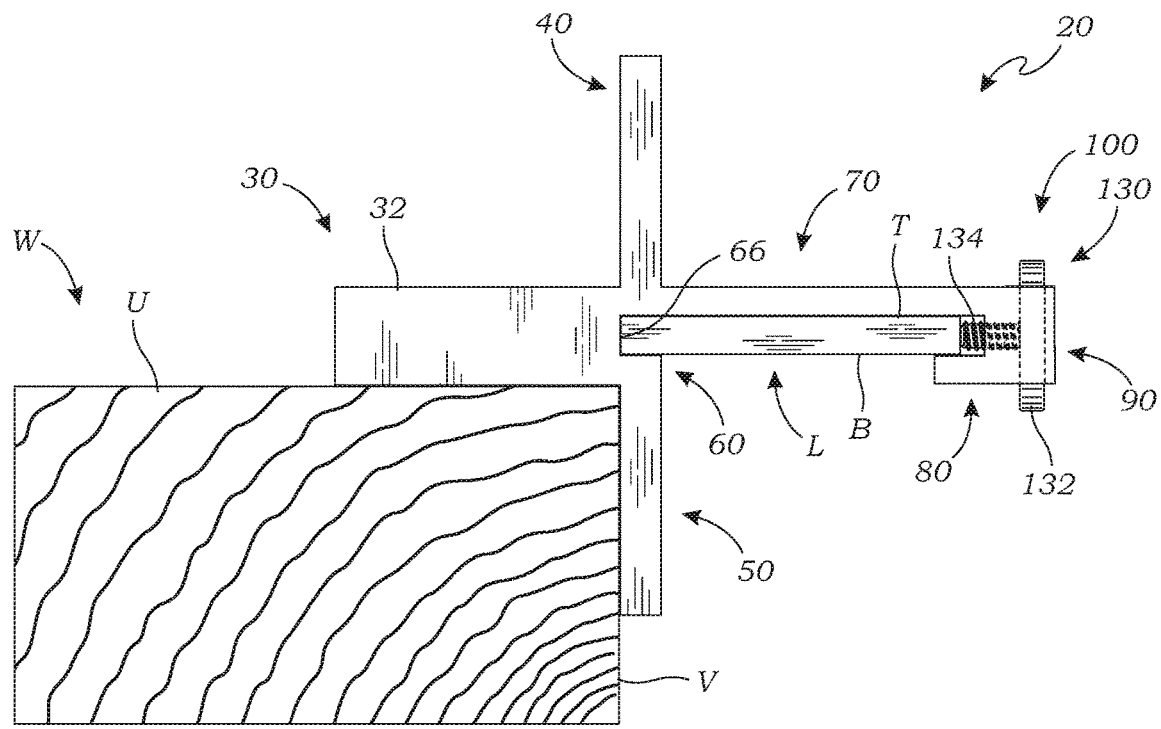
FIG. 13B is a side view of a still further alternative exemplary square gauge apparatus with a leg of a carpenter's square engaged therewith and positioned on a workpiece, in accordance with at least one embodiment.
Figure 14:
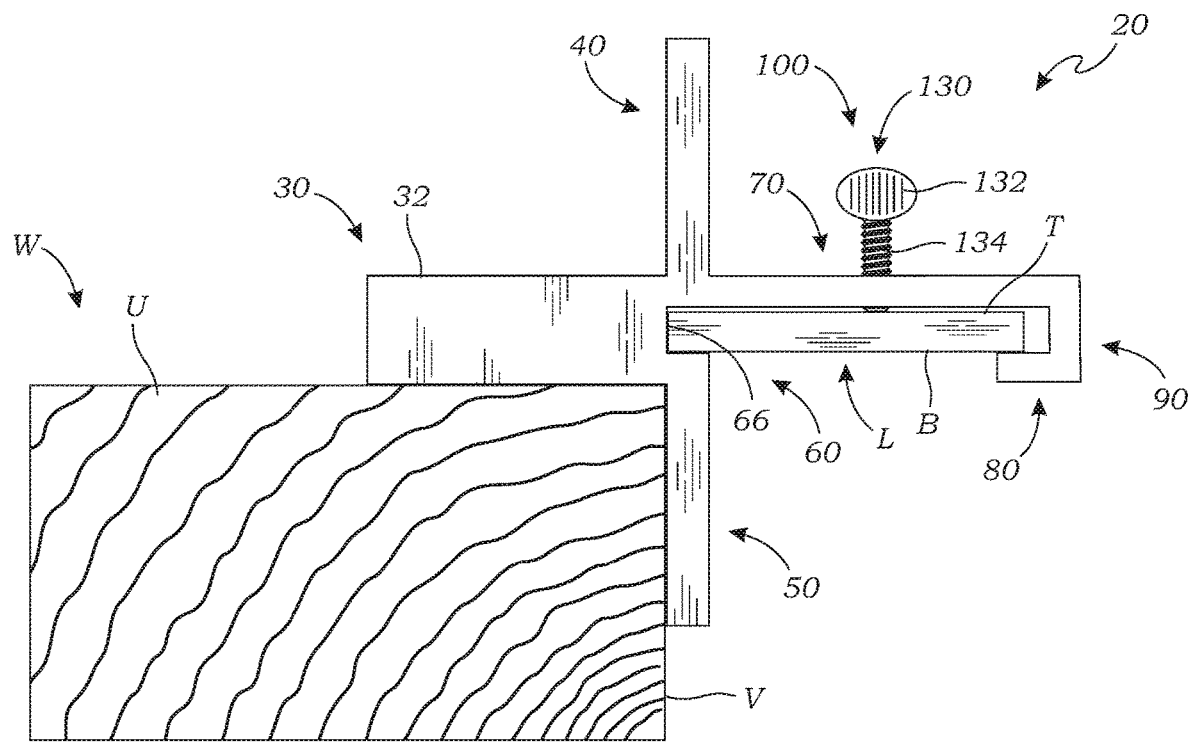
FIG. 14 is a side view of a still further alternative exemplary square gauge apparatus with a leg of a carpenter's square engaged therewith and positioned on a workpiece, in accordance with at least one embodiment.
Figure 15:
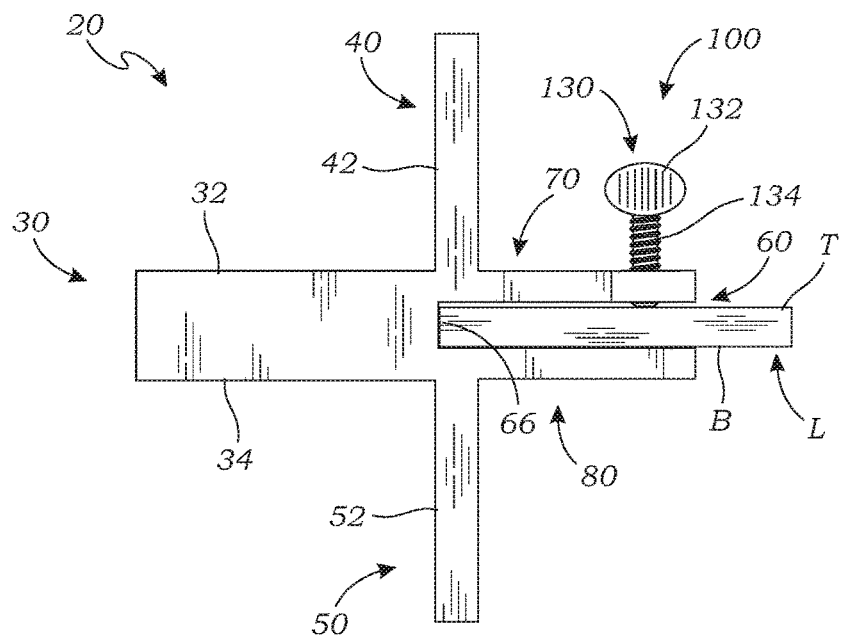
FIG. 15 is a side view of a still further alternative exemplary square gauge apparatus with a leg of a carpenter's square engaged therewith and positioned on a workpiece, in accordance with at least one embodiment.

Turning finally to FIGS. 13A and 13B along with FIGS. 14 and 15, there are illustrated side views of various further alternative exemplary embodiments of a square gauge apparatus 20 according to aspects of the present invention, here primarily in connection with further exemplary arrangements of the "back end" of the gauge 20 as relating to first, second, and/or third clamp legs 70, 80, 90 and an associated clamp device 100 for selectively and temporarily securing the gauge 20 on a leg L of a square S (FIGS. 7-9), the "front end" of the gauge 20 as shown being substantially like that of FIGS. 1-6 with regard to the ledge 30 and opposed first and second abutments 40, 50, though it will be appreciated by those skilled in the art that a variety of such components and configurations and combinations thereof are possible according to aspects of the present invention without departing from its spirit and scope, such that all such exemplary embodiments are to be understood as illustrative and non-limiting. First, in FIG. 13A there is shown an alternative exemplary gauge 20 wherein the first clamp leg 70 extends rearwardly and perpendicularly from the upper first abutment 40 substantially opposite of and parallel to the ledge 30, while the opposite second clamp leg 80 instead of similarly extending from the lower second abutment 50, though still being situated substantially perpendicular to the second abutment 50 and parallel to the ledge 30, is instead suspended offset therefrom through an interconnecting third clamp leg 90 located rearwardly opposite the ledge 30 and parallel to the first and second abutments 40, 50, in the exemplary embodiment such third clamp leg 90 being substantially parallel to and offset from the first and second abutments 40, 50. As such, the upper first clamp leg 70 thus extends rearwardly a distance longer than the width of any square leg L or other such structure to be retained within the gauge 20 while the lower second clamp leg 80 may be substantially shorter, as illustrated being long enough to extend forwardly from the interconnecting third clamp leg 90 so as to be at least partially positioned beneath the square leg L at its back edge, or its edge opposite edge E positioned toward the ledge 30 and against the slot end surface 66 when the leg L is seated within the slot 60 during use as illustrated. The exemplary clamp device 100 here is configured as a thumb screw 130 threadably engaged in the vertical third clamp leg 90 so that its threaded thumb screw body 134 passes through the third clamp leg 90 and selectively seats against the back edge of the square leg L as adjusted or tightened by operation thereof via the thumb screw head 132 so as to secure the leg L in place within the gauge 20 and force the leg L forwardly within the slot 60 against the slot end surface 66, thereby again assuring vertical alignment of the forward edge E of the leg L with the front surfaces 42, 52 of the respective first and second abutments 40, 50 due to the vertical alignment of the slot end surface 66 with the first and second abutment front surfaces 42, 52. Similarly, with reference to FIG. 13B, there is shown an exemplary arrangement much like that of FIG. 13A, only here with the vertical third clamp leg 90 being relatively thicker and recessed on its rearward surface so as to allow for the thumb screw 130 and particularly the thumb screw head 132 to be inset or not extend laterally beyond the rearward surface of the vertical third clamp leg 90 or the rearward end of the first clamp leg 70. To accommodate the vertical thickness of the back end of the gauge 20 while still being able to access and manipulate the inset thumb screw 130, the thumb screw head 132 may here be formed relatively flatter and larger in diameter so that it does not extend rearwardly beyond the vertical third clamp leg 90 but does extend laterally beyond the first and second clamp legs 70, 80 as illustrated in FIG. 13B. Those skilled in the art will appreciate that when checking an inside corner for square, having the thumb screw 130 recessed or inset allows the outside of the square S to still be used as a square even with the gauges 20 attached to one leg L of the square S in try square mode (as illustrated in FIG. 7, with two gauges 20 on leg L1), the rearward edge or surface of the vertical third clamp leg 90 of each gauge 20 thus serving as abutting surfaces perpendicular to the outer edge of the other square leg L (leg L2 in the illustrated arrangement of FIG. 7). This also has a few advantages in having the back end of both gauges 20 offset from but precisely parallel to the front or inside edge of the square S and again perpendicular to the opposite leg L of the square S, such as in checking inside corners of pipes typically joined by a pipe fitting such that the inside corner is rounded, by a weld in the corner, etc., while again not having to remove the gauges 20 from the square S to check such an inside corner. In FIG. 14 there is illustrated yet another exemplary arrangement much like that of FIG. 13A, only here with the thumb screw 130 threadably inserted in and through the top first clamp leg 70 with its body 134 somewhat parallel to the abutments 40, 50. As such, the thumb screw body 134 seats against the top surface T of the leg L of the square S while the bottom surface B of the leg L is supported at or near opposite ends or edges forwardly within the notch 60 and rearwardly by the offset second clamp leg 80 again supported or suspended relative to the first clamp leg 70 by the vertical third clamp leg 90. In this arrangement, somewhat analogous to that of the alternative exemplary embodiment of FIGS. 10 and 11, the square leg L is to be shifted forwardly within the slot 60 of the gauge 20 such that its forward edge E is abutted or seated against the slot end surface 66 as the thumb screw 130 is tightened to secure the gauge 20 in position of the leg L of the square S. With any such leg L or other structure being clamped vertically as through the illustrated vertical thumb screw 130, it will be appreciated that the slot 60 or the space between opposite clamp legs 70, 80 may be relatively larger to allow for a range of thicknesses of such square legs L or other structure on which the gauge 20 is to be mounted. And finally, as somewhat of a cross between other exemplary embodiments herein, shown in FIG. 15 is a still further alternative exemplary embodiment of a square gauge apparatus 20 according to aspects of the present invention again having an illustrated "front end" much like that of FIGS. 1-6 and 13A-14, with the "back end" arrangement involving two spaced apart or offset and substantially parallel first and second clamp legs 70, 80, here with the first clamp leg 70 extending rearwardly and perpendicularly from the upper first abutment 40 and the second clamp leg 80 extending rearwardly and perpendicularly from the lower second abutment 50, both legs 70, 80 being substantially opposite of and parallel to the ledge 30, the space or gap between the first and second clamp legs 70, 80 thereby forming the slot 60 for receipt therein or therebetween of a leg L of a square S or other such structure. As in FIG. 14, a clamp device 100 in the form of a thumb screw 130 is again threadably installed within the first clamp leg 70 such that the threaded thumb screw body 134 may be selectively tightened against the top surface T of the leg L and thus seat the leg's bottom surface B against the opposite second clamp leg 80. Structurally, the opposite first and second clamp legs 70, 80 are thus long enough or extend rearwardly from the ledge 30 and first and second abutments 40, 50 sufficiently to provide support for the square leg L and specifically to provide sufficient material for operable installation of the thumb screw 130 but otherwise need not be so long as to extend rearwardly the full width of the square leg L or other structure or thus be of any particular length, with there being no third clamp leg 90 needed rearwardly to interconnect or span the first and second clamp legs 70, 80. It will be appreciated by those skilled in the art that such arrangement as illustrated in FIG. 15 thus allows for an indeterminate or virtually infinite size or width of components such as square legs L or the like to be inserted within the gauge 20, while again allowing for the slot 60 or the space between opposite clamp legs 70, 80 to be relatively larger due to the vertical clamping via the thumb screw 130 so as to allow for a range of thicknesses of such square legs L or other structure on which the gauge 20 is to be mounted, providing even further versatility in use.

Those skilled in the art will again appreciate that a wide variety of square gauge 20 arrangements according to aspects of the present invention beyond those shown and described, here particularly including a variety of "back end" arrangements for selectively securing a square leg L or the like within such a gauge 20, are possible without departing from the spirit and scope of the invention, such that all exemplary embodiments herein are to be understood as illustrative of features and aspects of the invention and expressly non-limiting. In the case of any such arrangement wherein a clamp device 100 of a gauge 20 is configured as a thumb screw 130 or the like, it will be appreciated, though not shown, that the free end of the thumb screw body 134 may be capped or have installed thereon a rubber, plastic or other material or member that will not only assist with frictional engagement against a surface or edge of a square leg L or other structure but will also prevent marring any such surface or edge when the thumb screw 130 is tightened against it. By way of further illustration and not limitation, it is also conceived according to aspects of the present invention that a carpenter's square S may be sold as a package with a pair of appropriately-sized and configured square gauges 20 according to aspects of the present invention. Of course, a pair of such square gauges 20 may be sold separately or may be sold with a carpenter's square S and/or other tool as well.

Aspects of the present specification may also be described as follows:

1. A square gauge apparatus for being selectively and removably mounted on a leg of a carpenter's square, the apparatus comprising: a ledge having a ledge first surface and an opposite ledge second surface, the ledge first and second surfaces being parallel and offset so as to define a ledge thickness; a first abutment extending from the ledge and having a first abutment front surface that is perpendicular to the ledge first surface; a second abutment extending from the ledge opposite the first abutment and having a second abutment front surface that is perpendicular to the ledge second surface and parallel to and coplanar with the first abutment front surface; and a slot formed adjacent to the ledge between the first and second abutments, the slot having a slot end surface that is parallel to and coplanar with the first and second abutment front surfaces, whereby: the apparatus is configured such that placement of the leg of the carpenter's square within the slot with a leg edge against the slot end surface positions the leg edge parallel to and coplanar with the first and second abutment front surfaces and placement of the ledge on a workpiece with either the first or second ledge surface against a workpiece surface and either the respective first or second abutment front surface against an adjacent workpiece edge aligns the square leg edge with the workpiece edge at a desired location, rendering the carpenter's square accurate and versatile in multiple uses.

2. The apparatus of embodiment 1 wherein the ledge further comprises opposite and parallel ledge side surfaces defining a ledge width, the ledge side surfaces being perpendicular to the ledge first and second surfaces and to both the first and second abutment front surfaces and the slot end surface, whereby the apparatus is configured such that in use the leg edge of the carpenter's square is perpendicular to the ledge side surfaces.

3. The apparatus of embodiment 2 wherein the ledge side surfaces are planar.

4. The apparatus of embodiment 2 or embodiment 3 wherein the ledge width is one-and-a-half inches (1½ in.).

5. The apparatus of any of embodiments 2-4 wherein the first abutment further comprises opposite and parallel first abutment side surfaces defining a first abutment width, the first abutment side surfaces being perpendicular to the first abutment front surface.

6. The apparatus of embodiment 5 wherein the first abutment side surfaces are parallel to and coplanar with the respective ledge side surfaces.

7. The apparatus of embodiment 5 or embodiment 6 wherein the first abutment side surfaces are planar.

8. The apparatus of any of embodiments 5-7 wherein the first abutment width is one-and-a-half inches (1½ in.).

9. The apparatus of any of embodiments 5-8 wherein the second abutment further comprises opposite and parallel second abutment side surfaces defining a second abutment width, the second abutment side surfaces being perpendicular to the second abutment front surface.

10. The apparatus of embodiment 9 wherein the second abutment side surfaces are parallel to and coplanar with the respective first abutment side surfaces and the respective ledge side surfaces.

11. The apparatus of embodiment 9 or embodiment 10 wherein the second abutment side surfaces are planar.

12. The apparatus of any of embodiments 9-11 wherein the second abutment width is one-and-a-half inches (1½ in.).

13. The apparatus of any of embodiments 1-12 wherein the ledge further comprises a ledge end surface offset from the first and second abutments and defining a ledge length therebetween.

14. The apparatus of embodiment 13 wherein the ledge length is in the range of one-quarter inch to three inches (¼-3 in.).

15. The apparatus of embodiment 13 or embodiment 14 wherein the ledge end surface is parallel to the first and second abutment front surfaces.

16. The apparatus of any of embodiments 13-15 wherein the ledge end surface is parallel to the slot end surface.

17. The apparatus of any of embodiments 13-16 wherein the ledge end surface is planar.

18. The apparatus of any of embodiments 13-17 wherein the ledge end surface is perpendicular to the ledge side surfaces.

19. The apparatus of any of embodiments 1-18 wherein the slot is further formed having a slot first surface and an opposite slot second surface, the slot first and second surfaces being parallel and offset so as to define a slot thickness and further being parallel to the ledge first and second surfaces, whereby the apparatus is configured such that in use a leg surface of the carpenter's square is parallel to the ledge first and second surfaces and thus to the workpiece surface.

20. The apparatus of embodiment 19 wherein the ledge thickness is greater than the slot thickness.

21. The apparatus of embodiment 19 or embodiment 20 further comprising: a first clamp leg extending from the first abutment opposite of and parallel to the ledge and perpendicular to the first abutment front surface; and a second clamp leg offset from the first clamp leg.

22. The apparatus of embodiment 21 wherein the first and second clamp legs are offset and parallel so as to be a continuation of the slot, the slot first surface being formed along the first clamp leg and the slot second surface being formed along the second clamp leg.

23. The apparatus of embodiment 21 or embodiment 22 wherein the second clamp leg is opposite of and parallel to the ledge and perpendicular to the second abutment front surface.

24. The apparatus of any of embodiments 21-23 wherein the second clamp leg extends from the second abutment.

25. The apparatus of any of embodiments 21-24 wherein the second clamp leg is interconnected with the first clamp leg by a third clamp leg.

26. The apparatus of any of embodiments 21-25 wherein second clamp leg is spaced from the second abutment.

27. The apparatus of embodiment 25 or embodiment 26 wherein the third clamp leg is opposite of and perpendicular to the ledge.

28. The apparatus of any of embodiments 21-27 further comprising a clamp device for selectively and temporarily securing the square leg within the slot.

29. The apparatus of embodiment 28 wherein the clamp device comprises a camming assembly.

30. The apparatus of embodiment 29 wherein the camming assembly comprises a camming screw operably spanning the first and second clamp legs, the camming screw comprising a camming screw head and a threaded camming screw body extending therefrom.

31. The apparatus of embodiment 30 wherein the camming screw body is parallel to and offset from the first and second abutments, whereby sufficient separation is provided between the first and second abutments and the camming screw for receipt of the square leg therebetween within the slot.

32. The apparatus of embodiment 30 or embodiment 31 wherein the camming screw head is seated against the second clamp leg and the camming assembly further comprises a camming base opposite of the camming screw head and seated against the first clamp leg and a camming handle cross-pin pivotally installed within a camming handle slidably seated against the camming base, the camming screw body threadably engaging the camming handle cross-pin to complete operable installation of the camming assembly on the apparatus.

33. The apparatus of embodiment 28 wherein the clamp device comprises a thumb screw having a thumb screw head and a threaded thumb screw body extending therefrom.

34. The apparatus of embodiment 33 wherein the thumb screw is operably installed in the first clamp leg so as to selectively tighten against the leg surface.

35. The apparatus of embodiment 33 or embodiment 34 wherein the thumb screw is operably installed in a third clamp leg that is perpendicular to the first clamp leg so as to selectively tighten against an adjacent leg edge.

36. The apparatus of embodiment 35 wherein the thumb screw head is inset within the third clamp leg.

37. The apparatus of any of embodiments 28-36 wherein the slot thickness is greater than the square leg thickness.

38. The apparatus of any of embodiments 19-36 wherein the slot thickness is equal to the square leg thickness, whereby the square leg is frictionally retained within the slot.

39. The apparatus of any of embodiments 1-38 being of unitary construction.

40. The apparatus of any of embodiments 1-38 comprising first and second portions, the first abutment being formed on the first portion and the second abutment being formed on the second portion.

41. The apparatus of embodiment 40 wherein the ledge and the slot are formed within the first and second portions as combined.

42. A method of employing a square gauge apparatus as defined in any one of embodiments 1-41, the method comprising the steps of: removably installing first and second apparatuses on one or both legs of the carpenter's square at desired locations therealong; and placing the carpenter's square on the workpiece as by seating either the first or second ledge surfaces against the workpiece surface and either the respective first or second abutment front surfaces against the adjacent workpiece edge.

43. The method of embodiment 42 wherein the step of removably installing first and second apparatuses comprises installing the first and second apparatuses together on a first leg of the carpenter's square.

44. The method of embodiment 43 wherein the first and second ledges of the first and second apparatuses are adjacent to and oriented away from an inside edge of the first leg in a try square configuration.

45. The method of embodiment 44 wherein the step of placing the carpenter's square comprises seating the first and second ledges on the workpiece surface adjacent to a common workpiece edge with the respective abutment front surfaces in contact with the common workpiece edge, whereby a second leg of the carpenter's square overlays the workpiece surface perpendicular to the workpiece edge.

46. The method of embodiment 45 comprising the further steps of: making a first mark on the workpiece surface along at least one edge of the second leg of the carpenter's square; making a second mark on the workpiece surface along at least one ledge side surface; and repositioning the carpenter's square on the workpiece surface maintaining contact of the first and second ledges and abutment front surfaces with the respective workpiece surface and common workpiece edge to position the at least one edge of the second leg at the second mark.

47. The method of embodiment 42 wherein the step of removably installing first and second apparatuses comprises installing the first apparatus on a first leg of the carpenter's square and the second apparatus on a second leg of the carpenter's square.

48. The method of embodiment 47 wherein the first ledge of the first apparatus is adjacent to and oriented away from an inside edge of the first leg and the second ledge of the second apparatus is adjacent to and oriented away from an inside edge of the second leg in a rafter gauge configuration for rafter layout.

49. The method of embodiment 48 wherein the first apparatus is positioned along the first leg at a rafter rise dimension and the second apparatus is positioned along the second leg at a rafter run dimension.

50. The method of embodiment 49 wherein the step of placing the carpenter's square comprises seating the first and second ledges on the workpiece surface adjacent to a common workpiece edge with the respective abutment front surfaces in contact with the common workpiece edge, whereby the first and second legs of the carpenter's square overlay the workpiece surface each at an angle to the workpiece edge.

51. The method of embodiment 50 comprising the further steps of: making a first mark on the workpiece surface along at least one edge of the first leg of the carpenter's square representative of a peak cut; repositioning the carpenter's square on the workpiece surface maintaining contact of the first and second ledges and abutment front surfaces with the respective workpiece surface and common workpiece edge to position the at least one edge of the first leg at a location offset from the first mark; making a second mark on the workpiece surface along the at least one edge of the first leg of the carpenter's square representative of the height of a bird's mouth cut; repositioning the carpenter's square on the workpiece surface maintaining contact of the first and second ledges and abutment front surfaces with the respective workpiece surface and common workpiece edge back toward the first mark to position the at least one edge of the second leg at a desired location intermediate the first and second marks; making a third mark on the workpiece surface along an at least one edge of the second leg of the carpenter's square between the second apparatus and the second mark representative of the level of the bird's mouth cut; repositioning the carpenter's square on the workpiece surface maintaining contact of the first and second ledges and abutment front surfaces with the respective workpiece surface and common workpiece edge to position the at least one edge of the first leg at a location offset from the first, second, and third marks; and making a fourth mark on the workpiece surface along the at least one edge of the first leg of the carpenter's square representative of a tail cut.

52. The method of embodiment 47 wherein the first ledge of the first apparatus is adjacent to and oriented away from an outside edge of the first leg and the second ledge of the second apparatus is adjacent to and oriented away from an outside edge of the second leg in a stair gauge configuration for stair stringer layout.

53. The method of embodiment 52 wherein the first apparatus is positioned along the first leg at a stair riser dimension and the second apparatus is positioned along the second leg at a stair tread dimension.

54. The method of embodiment 53 comprising the further steps of: making a first mark on the workpiece surface along at least one edge of the first leg of the carpenter's square, between the first apparatus and the second leg of the carpenter's square and representative of a stair riser of the stair stringer; making a second mark on the workpiece surface along at least one edge of the second leg of the carpenter's square, between the second apparatus and the first leg of the carpenter's square and representative of a stair tread of the stair stringer; making a third mark on the workpiece surface along at least one ledge side surface of the second apparatus so as to intersect the second mark at ninety degrees, representative of a successive stair riser of the stair stringer; and repositioning the carpenter's square on the workpiece surface maintaining contact of the first and second ledges and abutment front surfaces with the respective workpiece surface and common workpiece edge to position the at least one edge of the first leg at the third mark.

55. The method of any of embodiments 42-54 wherein the step of removably installing first and second apparatuses comprises operating a clamp device.

56. The method of embodiment 55 wherein the step of operating the clamp device comprises pivoting a camming handle.

57. The method of embodiment 56 wherein the step of operating the clamp device comprises turning a thumb screw.

58. The method any of embodiments 42-57 wherein the step of removably installing first and second apparatuses comprises frictionally engaging a leg of a carpenter's square within respective first and second slots of the first and second apparatuses.

59. The method of embodiment 58 comprising the further step of flexing each apparatus so as to selectively open the respective slot for receipt therein of the respective leg of the carpenter's square.

60. A kit comprising a square gauge apparatus as defined in any one of embodiments 1-41.

61. The kit of embodiment 60 comprising two square gauge apparatuses.

62. The kit of embodiment 60 or embodiment 61 comprising a carpenter's square.

63. The kit of any of embodiments 60-62 comprising instructional material.

64. The kit of embodiment 63 wherein the instructional material provides instructions on how to perform the method as defined in any one of embodiments 42-59.

65. Use of a square gauge apparatus as defined in any one of embodiments 1-41 to selectively mark a workpiece in conjunction with a carpenter's square.

66. The use of embodiment 65 wherein the use comprises a method as defined in any one of embodiments 42-59.

Aspects of the present specification may also be further described or summarized as follows. A square gauge apparatus 20 according to aspects of the present invention has a slot 60 that accepts the edge E of a carpenter's square S and has two vertical abutments 40, 50 located above and below the slot 60 and a horizontal ledge aligned with the slot 60, it being appreciated that "horizontal" and "vertical" are a matter of convenient reference as to certain features that are parallel or perpendicular to certain other features and that notwithstanding such terminology such a square gauge apparatus 20 can be employed spatially in any orientation as can be and depending on the spatial orientation of any workpiece W and thus any carpenter's square S employed with one or more apparatuses 20. A pair of apparatuses 20 attached to a carpenter's square S allow greater ease and precision in marking or checking ninety degrees (90°) by giving the square S a pair of abutments 40, 50 both above and below the leg L of the square S, essentially giving the carpenter's square S attributes of a try square. The abutments 40, 50 abut the vertical linear edge V of the lumber or other workpiece W, easily aligning the vertical edge E of the leg L of the square S with the vertical edge V of the lumber or other workpiece W, and the horizontal ledges 30 rest upon the horizontal surface U of the lumber or other workpiece W, supporting the leg L of the square S. A pair of square gauge apparatuses 20 can also be attached to the square S in various positions to precisely mark or check angles, such as but not limited to, rafter ends and tread and riser cut marks on stair jacks. In operation, multiple combinations of the placement of the square gauges 20 are possible. In one exemplary embodiment, again, the abutments 40, 50 of a pair of gauges 20 on a single leg L of a square S essentially turn the square S into a try square. The ledges 30 also support the leg L of the square S overhanging the lumber or other workpiece W so the worker can let go of it. In addition, either gauge 20 can be set a precise distance from the ninety degree (90°) blade of the square S and be used as a marking gauge for marking repetitive distances, as in framing, stud placement markings sixteen inches (16 in.) apart, or cut lines for standard length blocking between studs. And the sides of the ledges 30 being at a ninety degree (90°) angle from the square's blade L can be used to make a short mark for the next tread or riser for precise placement of cut lines in the stair jack or stair stringer context. The manufacture of the square gauge 20 can be accomplished by a number of means, such as but not limited to, casting, injection molding, forming into required shapes, or extruding multiple rigid materials, such as but not limited to aluminum or other metals, or various plastics, with any extrusions then cut to a desired length as needed. The body of a finished square gauge 20 can be of a single piece, or as two or more assembled pieces.

In closing, regarding the exemplary embodiments of the present invention as shown and described herein, it will be appreciated that a new and novel square gauge apparatus is disclosed and configured for selectively marking a workpiece in conjunction with a carpenter's square or the like. Because the principles of the invention may be practiced in a number of configurations beyond those shown and described, it is to be understood that the invention is not in any way limited by the exemplary embodiments, but is able to take numerous forms in doing so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of components or ingredients, properties such as dimensions, weight, concentration, reaction conditions, and so forth, used to describe and claim certain embodiments of the inventive subject matter are to be understood as being modified in some instances by terms such as "about," "approximately," or "roughly." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in any specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A square gauge apparatus for being selectively and removably mounted on a leg of a carpenter's square, the apparatus comprising:
   a ledge having a ledge first surface and an opposite ledge second surface, the ledge first and second surfaces being parallel and offset so as to define a ledge thickness;
   a first abutment extending from the ledge and having a first abutment front surface that is perpendicular to the ledge first surface;
   a second abutment extending from the ledge opposite the first abutment and having a second abutment front surface that is perpendicular to the ledge second surface and parallel to and coplanar with the first abutment front surface; and
   a slot formed adjacent to the ledge between the first and second abutments, the slot having a slot end surface that is parallel to and coplanar with the first and second abutment front surfaces, whereby:
   the apparatus is configured such that placement of the leg of the carpenter's square within the slot with a leg edge against the slot end surface positions the leg edge parallel to and coplanar with the first and second abutment front surfaces and placement of the ledge on a workpiece with either the first or second ledge surface against a workpiece surface and either the respective first or second abutment front surface against an adjacent workpiece edge aligns the square leg edge with the workpiece edge at a desired location, rendering the carpenter's square accurate and versatile in multiple uses.

2. The apparatus of claim 1 wherein the ledge further comprises opposite and parallel ledge side surfaces defining a ledge width, the ledge side surfaces being perpendicular to the ledge first and second surfaces and to both the first and second abutment front surfaces and the slot end surface, whereby the apparatus is configured such that in use the leg edge of the carpenter's square is perpendicular to the ledge side surfaces.

3. The apparatus of claim 2 wherein the ledge side surfaces are planar.

4. The apparatus of claim 2 wherein the ledge width is one-and-a-half inches (1½ in.).

5. The apparatus of claim 2 wherein:
   the first abutment further comprises opposite and parallel first abutment side surfaces defining a first abutment width, the first abutment side surfaces being perpendicular to the first abutment front surface; and
   the second abutment further comprises opposite and parallel second abutment side surfaces defining a second abutment width, the second abutment side surfaces being perpendicular to the second abutment front surface.

6. The apparatus of claim 5 wherein the first and second abutment side surfaces are parallel to and coplanar with the respective ledge side surfaces.

7. The apparatus of claim 5 wherein the first and second abutment side surfaces are planar.

8. The apparatus of claim 5 wherein the first and second abutment widths are one-and-a-half inches (1½ in.).

9. The apparatus of claim 1 wherein the ledge further comprises a ledge end surface offset from the first and second abutments and defining a ledge length therebetween, the ledge length being in the range of one-quarter inch to three inches (¼-3 in.).

10. The apparatus of claim 1 wherein the slot is further formed having a slot first surface and an opposite slot second surface, the slot first and second surfaces being parallel and offset so as to define a slot thickness and further being parallel to the ledge first and second surfaces, whereby the apparatus is configured such that in use a leg surface of the carpenter's square is parallel to the ledge first and second surfaces and thus to the workpiece surface.

11. The apparatus of claim 10 further comprising:
   a first clamp leg extending from the first abutment opposite of and parallel to the ledge and perpendicular to the first abutment front surface; and
   a second clamp leg offset from the first clamp leg opposite of and parallel to the ledge and perpendicular to the second abutment front surface, wherein the first and second clamp legs are offset and parallel so as to be a continuation of the slot, the slot first surface being formed along the first clamp leg and the slot second surface being formed along the second clamp leg.

12. The apparatus of claim 11 wherein the second clamp leg extends from the second abutment.

13. The apparatus of claim 11 wherein the second clamp leg is interconnected with the first clamp leg by a third clamp leg opposite of and perpendicular to the ledge.

14. The apparatus of claim 11 further comprising a clamp device for selectively and temporarily securing the square leg within the slot.

15. The apparatus of claim 14 wherein the clamp device comprises a camming assembly.

16. The apparatus of claim 15 wherein the camming assembly comprises a camming screw operably spanning the first and second clamp legs, the camming screw comprising a camming screw head and a threaded camming screw body extending therefrom, wherein the camming screw body is parallel to and offset from the first and second abutments, whereby sufficient separation is provided between the first and second abutments and the camming screw for receipt of the square leg therebetween within the slot.

17. The apparatus of claim 14 wherein the clamp device comprises a thumb screw having a thumb screw head and a threaded thumb screw body extending therefrom.

18. The apparatus of claim 17 wherein the thumb screw is operably installed in the first clamp leg so as to selectively tighten against the leg surface.

19. The apparatus of claim 17 wherein the thumb screw is operably installed in a third clamp leg that is perpendicular to the first clamp leg so as to selectively tighten against an adjacent leg edge.

20. The apparatus of claim 19 wherein the thumb screw head is inset within the third clamp leg.

\* \* \* \* \*